(12) United States Patent
Jackson

(10) Patent No.: US 8,226,158 B1
(45) Date of Patent: Jul. 24, 2012

(54) VEHICLE MIST SUPPRESSION APPARATUS AND METHOD OF USING SAME

(76) Inventor: Allen Forrest Jackson, Little Rock, AR (US)

( * ) Notice: Subject to any disclaimer, the term of this patent is extended or adjusted under 35 U.S.C. 154(b) by 111 days.

(21) Appl. No.: 12/879,466

(22) Filed: Sep. 10, 2010

(51) Int. Cl.
*B62D 25/18* (2006.01)
(52) U.S. Cl. .................. 296/198; 280/851; 280/160
(58) Field of Classification Search .................. 296/198; 280/851, 849, 160
See application file for complete search history.

(56) References Cited

U.S. PATENT DOCUMENTS

| | | |
|---|---|---|
| 491,276 A | 2/1893 | Whittum |
| 821,471 A | 5/1906 | Dewett et al. |
| 1,408,374 A | 2/1922 | McDonald |
| 3,721,459 A | 3/1973 | Lea |
| 3,743,343 A | 7/1973 | Grote, Sr. et al. |
| 3,860,262 A | 1/1975 | Goings |
| 3,866,943 A | 2/1975 | Innis |
| 3,869,617 A | 3/1975 | Gaussoin et al. |
| 3,874,697 A | 4/1975 | Thompson |
| 3,899,192 A | 8/1975 | Reddaway |
| 3,922,003 A | 11/1975 | Lea |
| 4,124,221 A | 11/1978 | Goings |
| 4,185,720 A | 1/1980 | Wright, Jr. et al. |
| 4,192,522 A | 3/1980 | Morgan |
| 4,205,861 A | 6/1980 | Roberts et al. |
| 4,258,929 A | 3/1981 | Brandon et al. |
| 4,290,619 A | 9/1981 | Goodall |
| 4,372,570 A | 2/1983 | Goodall |
| 4,445,700 A | 5/1984 | Schroeder |
| 4,655,468 A | 4/1987 | Cunningham |
| 4,817,976 A | 4/1989 | Kingsley |
| 4,858,941 A | 8/1989 | Becker |

(Continued)

FOREIGN PATENT DOCUMENTS

GB 2181396 A * 4/1987

(Continued)

OTHER PUBLICATIONS

International Search Report and Written Opinion of International Searching Authority, PCT/US 2011/047222, Mailing Date: Jan. 24, 2012, 9 pages.

(Continued)

*Primary Examiner* — H Gutman
(74) *Attorney, Agent, or Firm* — Ray F. Cox, Jr.

(57) ABSTRACT

The invention is essentially an apparatus and method for reducing the wheel-spray and the aerodynamic drag of a wheel-set of a vehicle having a framework with preexisting holes, the apparatus comprising a three-dimensionally adjustable support infrastructure anchored to the framework without the need for drilling or welding the support infrastructure to the framework; a three-dimensionally adjustable housing superstructure having a housing having an obtuse-angled forward side and an obtuse-angled rearward side for screening the wheel-set, with the housing affixed between a box-sleeve and a stand-on plate with a plurality of U-bolt fasteners, wherein the box-sleeve defines an interior chamber for receiving a girder; and two attenuation rings inserted along both external ends of the girder to dilute vibration from the vehicle to the housing; and a fastening means comprising a locking cap having domed arches and a transplanar bore, a counter-threaded locking bolt, and a locking pin. A tightening wrench may be used for tightening, and/or loosening the locking cap over a girder lateral terminus. A protective replaceable shield and connectors are also provided to protect and renew the housing side wall exterior surface.

19 Claims, 20 Drawing Sheets

U.S. PATENT DOCUMENTS

| | | | |
|---|---|---|---|
| 4,921,276 | A | 5/1990 | Morin |
| 5,080,397 | A | 1/1992 | Metcalf |
| 5,257,822 | A | 11/1993 | Metcalf |
| 5,277,444 | A | 1/1994 | Stropkay |
| 5,375,882 | A | 12/1994 | Koch, III |
| 5,487,565 | A | 1/1996 | Thompson |
| 6,220,803 | B1 | 4/2001 | Schellhase |
| 7,748,772 | B2 | 7/2010 | Boivin et al. |
| 7,887,120 | B2 | 2/2011 | Boivin et al. |
| 7,938,475 | B2 | 5/2011 | Boivin et al. |
| 7,942,467 | B2 | 5/2011 | Boivin et al. |
| 7,942,468 | B2 | 5/2011 | Boivin et al. |
| 7,942,469 | B2 | 5/2011 | Boivin et al. |
| 7,942,470 | B2 | 5/2011 | Boivin et al. |
| 7,942,471 | B2 | 5/2011 | Boivin et al. |
| 2005/0077725 | A1 | 4/2005 | Bartholoma et al. |
| 2010/0066123 | A1 | 3/2010 | Ortega et al. |

FOREIGN PATENT DOCUMENTS

| | | |
|---|---|---|
| WO | WO2012/021598 A1 | 2/2012 |

OTHER PUBLICATIONS

U.S. Appl. No. 12/855,516, Jackson, A.

http://www.transtexcomposite, com, Trailer Skirt Air Deflector, Transtex Composite, Quebec, Montreal, Canada, 10 pages, At least as early as May 11, 2012.

http://ridgecorp.com, Ridge Corporation, Green Wing Aerodynamic Side Skirts, Pataskala, Ohio, 8 pages, At leaset as early as May 11, 2012.

http://freightwing. com, Aeroflex Trailer Skirts, Freight Wing Incorporated, 17 pages, 2004-2011.

Freight Wing Type II Class Eight Semi Trailer Aerodynamic Fuel Economy Comparison Test, Transportation Research Center, Inc., East Liberty OH, May 2004.

Bachman, L. et al., Effect of Single Wide Tires and Trailer Aerodynamics on Fuel Economy and NOx Emissions of Class 8 Line-Haul Tractor-Trailers, U.S.E.P.A, 2005.

Leuschen, J. et al., Full-Scale Wind Tunnel Tests of Production and Prototype, Second-Generation Aerodynamic Drag-Reducing . . . , National Research Council, Ottawa, Canada, 2006.

Surcel, M., Energotest 2007: Fuel Consumption Test for Evaluating Freight Wing Trailer Side Skirts, FPInovations, Pointe-Clair, Quebec, Canada, Nov. 2007.

Surcel, M., Energotest 2008: Fuel Consumption Test for Prototypes of the Freight Wing Trailer Belly Fairing, FPInovations, Pointe-Clair, Quebec, Canada, Oct. 2008.

Class Eight Semi Truck Aerodynamic Fuel Economy Carb Component Test, Auto Research Center, Indianapolis, Indiana, Jun. 25, 2009.

Bachman, L., et al., Fuel Economy Improvements and NOx Reduction by Reduction of Parasitic Losses, SAE Technical Paper 2006-01-3474, Oct. 31, 2006.

\* cited by examiner

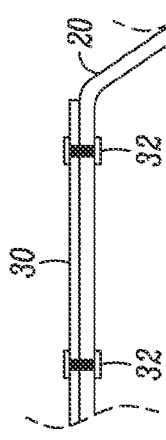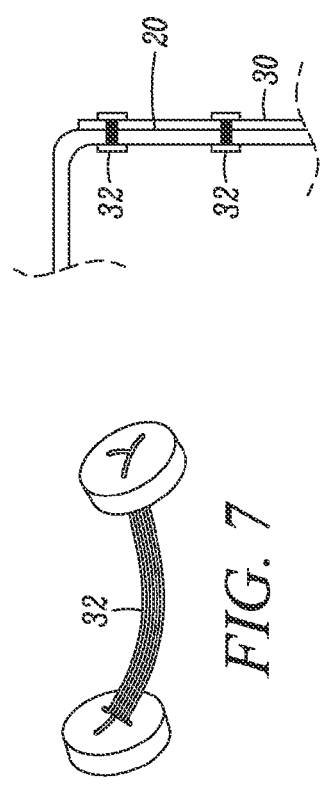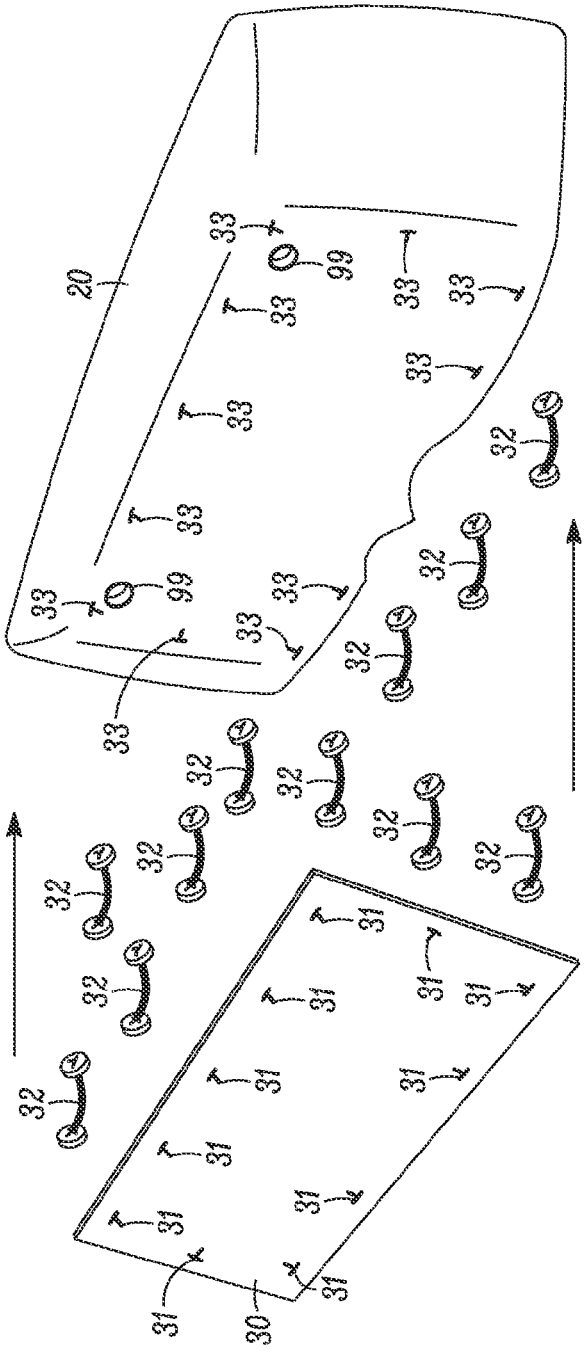

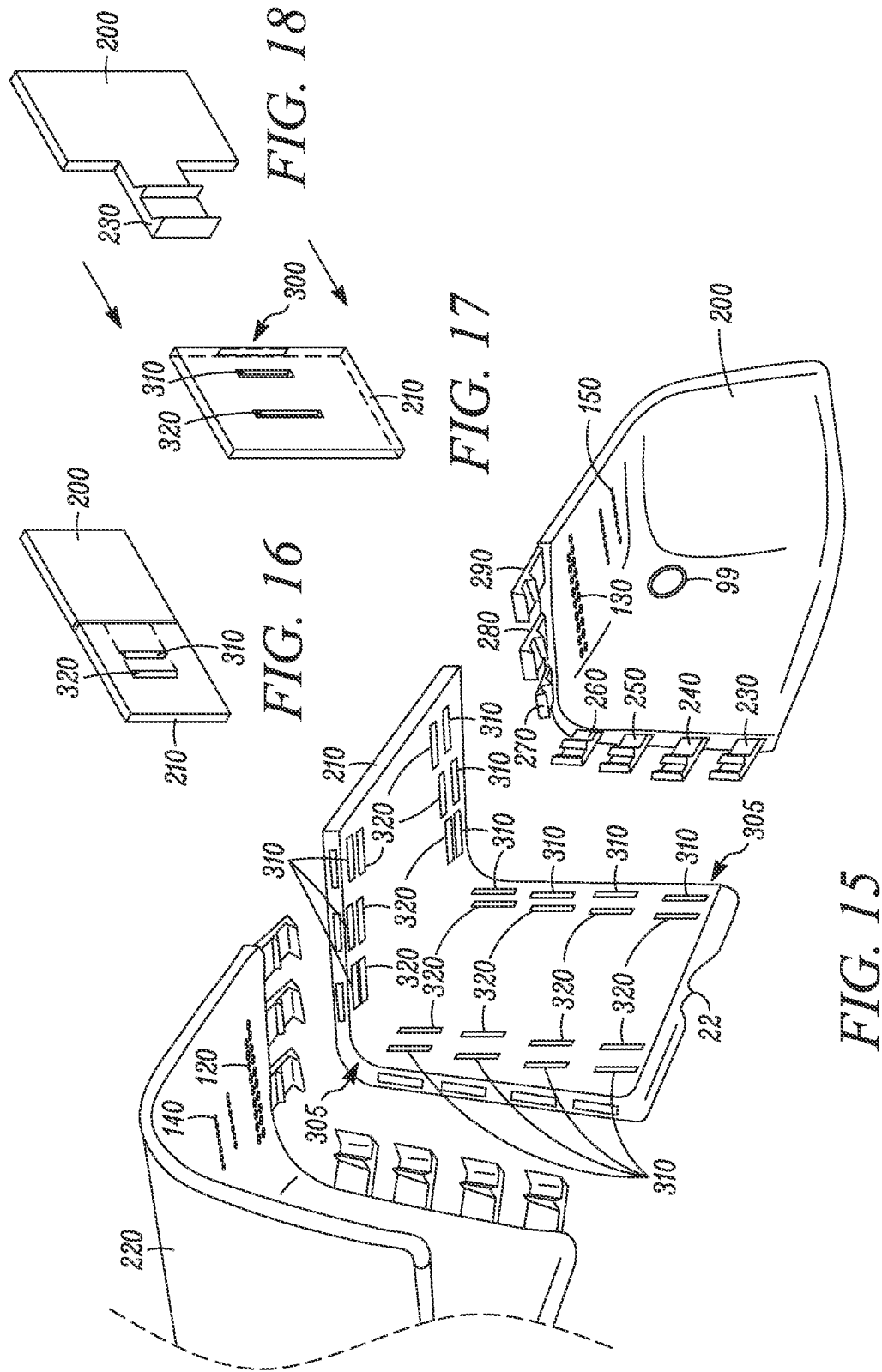

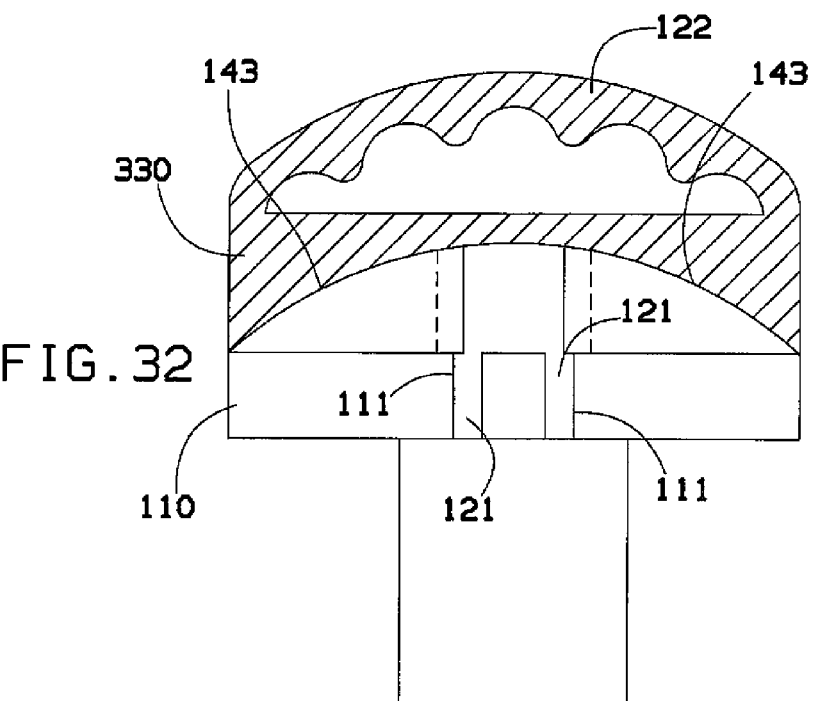
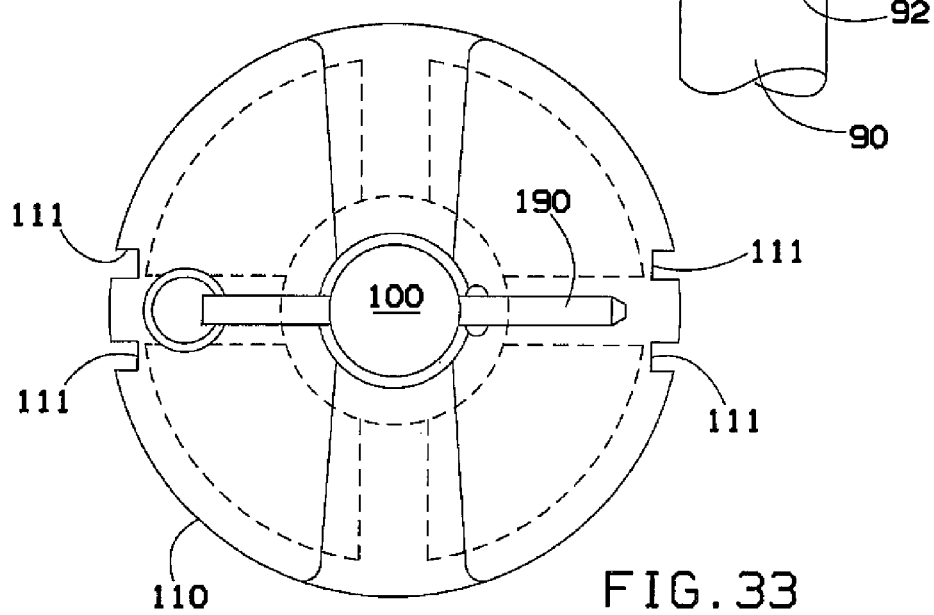

VEHICLE MIST SUPPRESSION APPARATUS AND METHOD OF USING SAME

CROSS REFERENCE TO RELATED APPLICATIONS

Out of an abundance of caution, Applicant discloses pending U.S. Utility patent application Ser. No. 12/855,516 filed Aug. 12, 2010, which discloses arguably similar subject matter, but patentably indistinct claims.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present invention generally relates to the field of reducing the rain mist, snow, slush, ice and wheel-spray generated from the rotation of the wheels and/or tandem wheel-sets of a large, heavy vehicle such as transport trucks, tractor trailers, and multi-configured cargo trailers as it travels over a wet roadway surface by providing a housing that screens (or retrofits) the wheel-sets. The housing is affixed between a box-sleeve and a stand-on plate to from a three-dimensionally adjustable housing superstructure connected to a three-dimensionally adjustable support infrastructure that is anchored onto the vehicle framework. It relates more particularly to an improved housing for screening the wheel-set and for increasing the aerodynamics; an adjustable housing superstructure for customizing the positioning of the housing in relation to the wheel-set; an adjustable support infrastructure for customizing the positioning of the apparatus in relation to the wheel-set; an improved fastening means for fastening the housing (and the housing superstructure) onto the support infrastructure and for preventing the fastening means from loosening. The apparatus also provides a replaceable protective shield that renews and protects the exterior surface of the housing side wall.

A roadway surface may become a wet roadway surface due to rain, snow, slush, flooding or any other combinations thereof (the "wet surface"). During these conditions, heavy vehicles generate blinding lateral and rearward wheel-spray beside and behind them as the wheels travel over the wet surface. With increasing vehicle highway speeds, not only does the aerodynamic drag of the vehicle's tandem wheel-sets increase, but the wheel-spray also increases and can include increasingly larger amounts of water and other road surface materials such as ice, slush, rocks, and/or debris which is then discharged into adjacent traffic lanes and onto other vehicles traveling along side or parallel with the heavy vehicle. This discharged wheel-spray is a safety hazard for it reduces the visibility and road safety not only for drivers being passed by the heavy vehicle but also other drivers traveling along side or attempting to pass, and for truck drivers.

Previous devices are not effective in controlling and reducing lateral wheel-spray and fail to effectively block high-speed tire blow-outs from slinging belts of tire tread into other nearby motorists and/or pedestrians. Some current options that may arguably address this issue include using rear mist or mud flaps, or top-over fenders; however, these options do not provide a user with a housing that encloses all sides of the tires facing outward toward other motorists to block lateral wheel-spray or to increase lateral and rearward visibility for both the truck driver and/or the nearby motorists. In this invention, the housing provides a protective barrier against vehicle tire blow-outs that can otherwise send belts of tire tread hurling along the roadway.

Previous devices neither allow a user to customize the positioning of a support infrastructure horizontally, laterally, and vertically in relation to the vehicle frame and the wheel-set, nor allow a user to the customize the positioning of a housing superstructure horizontally, laterally and vertically. It also does not provide a locking mechanism for locking and holding the housing in place. These devices also lack a simple way for quickly and easily installing and removing the housing superstructure to permit complete access to the wheels and undercarriage, and for easy reinstallation from a standing position. Previous devices do not increase vehicle motor and fuel efficiency because they do not reduce the aerodynamic drag created by the front surface of the wheel-set or from the exiting lateral and rearward turbulent wind and water forces that trail off the wheel-set. Previous devices do not provide a replaceable protective shield for renewing and protecting the housing exterior.

There remains a need for a housing that screens over a vehicle's wheel-set to reduce the lateral and rearward wheel-spray by redirecting the wheel-spray away from nearby motorists and toward the center of the vehicle's undercarriage and downwardly toward the ground.

There also remains a need for ease in adjusting a support infrastructure to a universally adaptive and customized position horizontally, laterally and vertically in relation to the wheel-set and the vehicle.

There also remains a need for ease in adjusting a housing superstructure to a universally adaptive and customized position horizontally, laterally and vertically in relation to the wheel-set and the vehicle.

There is also a need for a removable housing superstructure retrofitted over a wheel-set to reduce wheel-spray, and a support infrastructure that may be installed without drilling through or welding the support infrastructure to the vehicle framework.

There also remains a need for a housing superstructure that may be easily installed or removed for emergency roadside maintenance and/or routine shop repair.

There is also a need for a housing, retrofitted over a wheel-set to reduce wheel-spray, that is secured by a locking mechanism including a locking cap having a transplanar bore for rotational engagement with a girder having an externally threaded lateral terminus; a counter-threaded locking bolt inserted into the girder lateral terminus defining a counter-threaded axial bore; and a locking pin interlocked with the bolt further having an aperture, with the pin abutting against the cap further comprising two domed arches. The counter-clockwise inward rotational movement of the bolt and pin provide resistance against the counterclockwise outward rotational movement of the locking cap whenever the pin abuts the cap's domed arches, thereby preventing separation of the housing from the support infrastructure.

There is also a need for a housing, retrofitted over a wheel-set to reduce wheel-spray, to include a to side having a plurality of perforations for air-flow and ice evacuation, a forward side having a forward-angled face for reducing aerodynamic drag caused by the exposed tire surface pushing against the wind, and a rearward side having a rearward-angled face for reducing aerodynamic drag created by lateral and rearward turbulent wind and water forcibly exiting behind the wheel-set.

There is also a need for a housing, retrofitted over a wheel-set to reduce wheel-spray, that is connected between box-sleeves and stand-on plates to form a housing superstructure capable of being easily installed, removed and re-installed from a standing position.

There is also a need for a housing superstructure having box-sleeves that creates a protective barrier between the wheel-set and the housing top side against tire tread blow-out debris.

There is also a need for a housing superstructure to include an exterior stand-on plate for reinforcing the top of the housing and for standing on the housing for vehicle inspections and/or maintenance.

There is also a need for a housing having a side-wall exterior surface that will accept a multi-purpose shield that provides a renewable protective surface for the housing.

(2) Description of Related Art Including Information Disclosed 37 CFR 1.97 and 1.98

The following patents are arguably material to the patentability of the invention disclosed herein:

| Patent/App. # | 1st Inventor | Date of Issue/Publication |
| --- | --- | --- |
| 491,276 | Whittum | Feb. 7, 1893 |
| 3,721,459 | Lea | Mar. 20, 1973 |
| 3,743,343 | Grote, Sr. et al | Jul. 3, 1973 |
| 3,860,262 | Goings | Jan. 14, 1975 |
| 3,866,943 | Innis | Feb. 18, 1975 |
| 3,869,617 | Gaussoin, et al | Mar. 4, 1975 |
| 3,874,697 | Thompson | Apr. 1, 1975 |
| 3,899,192 | Reddaway | Aug. 12, 1975 |
| 3,922,003 | Lea | Nov. 25, 1975 |
| 4,124,221 | Goings | Nov. 7, 1978 |
| 4,192,522 | Morgan | Mar. 11, 1980 |
| 4,205,861 | Roberts et al | Jun. 3, 1980 |
| 4,258,929 | Brandon et al | Mar. 31, 1981 |
| 4,290,619 | Goodall | Sep. 22, 1981 |
| 4,372,570 | Goodall | Feb. 8, 1983 |
| 4,445,700 | Schroeder | May 1, 1984 |
| 4,655,468 | Cunningham | Apr. 7, 1987 |
| 4,817,976 | Kingsley | Apr. 4, 1989 |
| 4,858,941 | Becker | Aug. 22, 1989 |
| 4,921,276 | Morin | May 1, 1990 |
| 5,080,397 | Metcalf | Jan. 14, 1992 |
| 5,257,822 | Metcalf | Nov. 2, 1993 |
| 5,277,444 | Stropkay | Jan. 11, 1994 |
| 5,375,882 | Koch III | Dec. 27, 1994 |
| 5,487,565 | Thompson | Jan. 30, 1996 |
| US 2010/0066123 | Ortega et al. | Mar. 18, 2010 |

U.S. Pat. No. 4,921,276 issued to Morin essentially discloses a device for controlling the wet weather spray and splash generated when traveling on a roadway surface. It discloses a fender having a formed, rigid sheet mounted over and covering the wheels or set of wheels of a vehicle, and downwardly covering a small portion of the upper surface of the wheels at its forward and rearward ends. It further discloses a plurality of air intake apertures located in the upper part of the forward, curved end of the sheet to direct air flow from outside the fender to inside the fender and over the covered wheel or set of wheels during forward movement of the vehicle.

U.S. Pat. No. 4,192,522 issued to Morgan essentially discloses a splash and spray control shield for wheels of large vehicles consisting of a unit with side walls that covers the uppermost forward part, over the top of and the uppermost rearward part of the wheel or dual wheels, or wheels of adjacent axles. It also discloses an air collector that is designed to collect and direct the flow of air caused by the forward movement of the vehicle, across the top of the wheels, and rearwardly and downwardly behind the wheel directly to the road surface.

U.S. Pat. No. 3,860,262 issued to Goings essentially discloses a housing secured to the side of a vehicle overlying and spaced outwardly from the support of the wheels of the vehicle, having a substantially rigid panel parallel to the longitudinal axis of the vehicle and slidably mounted in said housing for vertical sliding movement into and out of the bottom of the housing. It further discloses a means for moving the panels into and out of the housing by using a remote control to activate an electric motor.

U.S. Pat. No. 3,874,697 issued to Thompson essentially discloses a shield for controlling the road spray created by a tandem wheeled vehicle traveling on wet pavement. It further discloses a V-shaped support member having a top cover and a side cover secured thereto for the purpose of containing the spray created by the rotating wheels. It discloses that the device is secured to the vehicle frame by means of an arm extending laterally from the inboard side of the support member.

U.S. Pat. No. 4,817,976 issued to Kingsley essentially discloses a vehicular rain skirt assembly having a locking assembly and spring-loaded pivoting mechanism. It further discloses that the rain skirt assembly can be pivoted upwardly into an inoperative position against the vehicle, projecting laterally from the vehicle body, when not in use. It discloses that the rain skirt can be mounted on the side frame of a conventional heavy vehicle, allowing a driver unobstructed access to the vehicle's running gear when the rain skirt is in its inoperative position. It further discloses mounting brackets and latching mechanisms. The invention discloses the mounting hardware as essentially comprising (including or having) a pair of generally L-shaped, fore and aft metal mounting brackets; each mounting bracket further comprising a vertical planar flange having a pair of "vertically aligned through apertures" which permit permanent, but separable, attachment to the side frame of the truck by means of completely conventional bolt/nut combinations. It further discloses that to permit pivotal attachment of the rain skirt assemblies to the vehicle, each mounting bracket includes a second vertical planar flange normal to the vertical planar flange and on which is integrally mounted a horizontally projecting pivot pin positioned to pass through the uppermost one of three generally vertically oriented, closely spaced, apertures formed in the leading and trailing edges of each of the panels.

None of the cited patents disclose each and every element of Applicant's invention.

Further, none of the cited patents disclose an apparatus comprising:

1. a three-dimensionally adjustable support infrastructure comprising an anchor plate for anchoring the support infrastructure horizontally to the vehicle framework, the anchor plate having a plurality of apertures for receiving two threaded struts for adjusting the support infrastructure laterally and vertically, wherein the anchor plate may be inverted upward or downward; a vertical-lateral plate having two vertical slots for adjustably receiving the struts, and an aperture above the slots for receiving a girder; and the girder having one end rotatably engaged with the vertical-lateral plate aperture, and another end having an externally threaded lateral terminus also defining an internally counter-threaded axial bore for receiving a fastening means;

2. a three-dimensionally adjustable housing superstructure comprising a box-sleeve having an interior chamber for slidably receiving the girder, and two exterior sides defining a plurality of vertical grooves; a housing substantially screening the wheel-set and comprising a forward side having an obtuse-angled forward face and a rearward a having an obtuse-angled rearward face, each for reducing aerodynamic drag; a top side having a plurality of apertures aligned with the vertical grooves and a plurality of perforations for anti-vacuum air flow and/or ice evacuation, and a side wall defining a forward opening for receiving a first girder and a first of the fastening means and a rearward opening for receiving a second girder and a second of the fastening means; and a stand-on plate having a plurality of apertures aligned with the housing apertures and with the vertical grooves for affixing the housing between the box-sleeve and the stand-on plate with a U-bolt terminal securing system; and 3. a fastening means for fastening the housing superstructure to the girder, the fastening means comprising a cap having two domed arches and an internally threaded transplanar bore for rotational engagement with the lateral terminus of the girder; a counter-threaded bolt having a diameter smaller than the transplanar bore, a length sufficient to rotationally engage the axial bore of the girder while inserted through the transplanar bore, a head larger than the girder axial bore for abutting against the girder axial bore, with the bolt head defining a pin-aperture; and a pin inserted through the bolt pin-aperture.

Also, none of the cited patents disclose an apparatus wherein the housing superstructure can be easily removed and reinstalled as one unit from the girder nor an apparatus for reducing vehicle vibration transferred to the housing superstructure. It also does not have a first attenuation ring, such as a pre-load compression X-ring spacer, located between the box-sleeve and the vertical-lateral plate for reducing vibration from the vehicle framework through support infrastructure to the housing superstructure, nor a second vibration block is a second attenuation ring, such as a post-load O-ring spacer, compressed between the box-sleeve and the housing, for reducing vibration between the box-sleeve and the housing. It also does not discloses a tightening tool, such as a customized wrench, having a convex exterior surface, a handle having a handgrip, and a plurality of prongs protruding from the tool to rotationally engage with the cap slots. Furthermore, these patents do not disclose a housing formed from an anti-electrostatic composition, or a means for attaching a multi-purpose replaceable protective shield for protecting and renewing the housing side wall exterior surface.

BRIEF SUMMARY OF THE INVENTION

Although the present invention has several embodiments, the invention described herein is an apparatus for reducing the wheel-spray and the aerodynamic drag of a wheel-set of a vehicle having a framework with holes, the apparatus comprising:

a. a three-dimensionally adjustable support infrastructure comprising: an anchor plate for anchoring the support infrastructure horizontal to the vehicle framework, the anchor plate having a plurality of apertures for receiving two threaded struts; a vertical-lateral plate having two vertical slots for adjustably receiving the struts, and an aperture above the slots for receiving a girder; and the girder having one end rotatably engaged with the vertical-lateral plate aperture, and another end having an externally threaded lateral terminus also defining an internally counter-threaded axial bore for receiving a fastening means;

b. a three-dimensionally adjustable housing superstructure comprising: a box-sleeve having an interior chamber for slidably receiving the girder, and two exterior sides defining a plurality of vertical grooves; a housing substantially screening the wheel-set and including an obtuse-angled forward face and an obtuse-angled rearward face, and a top side having a plurality of apertures aligned with the grooves; and a stand-on plate having a plurality of apertures aligned with the grooves for affixing the housing between the box-sleeve and the stand-on plate with a U-bolt terminal securing system; and c. a fastening means for fastening the housing superstructure to the girder.

In one embodiment where the vehicle is a truck, the anchor plate further comprises a plurality of perpendicular J-hooks to the anchor plate for horizontally anchoring to the framework preexisting holes. The anchor plate may be inverted upward or inverted downward. In an embodiment where the vehicle is a trailer, two anchor plates (an interior anchor plate and an exterior anchor plate) are used and are secured to the framework with the two threaded struts and a terminal securing system.

The housing further comprises a forward side having an obtuse-angled forward face extending forwardly over the forward section of the wheel-set; a rearward side having an obtuse-angled rearward face extending rearwardly over the rearward section of the wheel-set; a top side having a plurality of perforations for anti-vacuum air flow and for ice evacuation; and a side wall defining at least one forward opening for receiving a first girder and a first of the fastening means, and at least one rearward opening for receiving a second girder and a second of the fastening means, with the side wall further including a center-point curvature extending near the wheel-set's lowest rim line and for centering the housing with the wheel-set.

The apparatus further comprises a removable protective shield having a plurality of T-slots; and the exterior of the side wall further comprising a plurality of T-slots; and a plurality of connectors, each of the connectors having a stretchable band connected between two discs for connecting between each of the shield T-slots and each of the exterior side wall T-slots. The side wall may include a hard or a soft exterior surface for attaching a multi-purpose protective shield to protect and/or renew the side wall surface.

The housing superstructure further comprises a first attenuation ring receivable on the girder lateral terminus between the proximal end of a box-sleeve and the vertical-lateral plate for reducing vibration, and a second attenuation ring receivable on the girder lateral terminus between the lateral end of the box-sleeve and the housing side wall, and between the fastening means. The stand-on plate and box-sleeve are secured to the housing with a U-bolt terminal securing system, such as rectangular U-bolts, rectangular washers, and fastening nuts. The box-sleeve and the stand-on plate assist in supporting the housing over the support infrastructure.

In another embodiment, the housing has a segmented body comprising a forward segment, an intermediate segment, and a rearward segment. This embodiment allows for universal sizing options to fit numerous wheel-set widths by varying the width of the intermediate segment and keeping the sizes of the forward and rearward segments fixed and standardized. The housing in this embodiment comprises:

a. a forward segment comprising: (i) a forward side having an obtuse-angled forward face extending forwardly over the forward section of the wheel-set; (ii) a top side having a plurality of perforations for anti-vacuum air flow, and a plurality of apertures for affixing the housing to the box-sleeve and the stand-on plate with the terminal securing system; (iii) a side wall defining an opening for receiving a first girder and a first of the fastening means; and (iv) a plurality of saw-tooth clamps for connecting the forward segment to an intermediate segment;

b. the intermediate segment comprising: (i) a top side; (ii) a plurality of clamp ports, (iii) a plurality of locking slots; (iv) a plurality of gaskets for connecting the forward segment and a rearward segment to the intermediate segment; and (v) a side wall having a center-point curvature for centering the housing with the tandem wheel-sets; and c. the rearward segment comprising (i) a rearward side having an obtuse-angled rearward face extending rearwardly over the rearward section of the wheel-set (ii) a top side having a plurality of perforations for anti-vacuum air flow, and a plurality of apertures for affixing the housing to the box-sleeve and the stand-on plate with a U-bolt terminal securing system; (iii) a side wall defining an opening for receiving a second girder and a second of the fastening means; and (iv) a plurality of saw-tooth clamps for connecting the rearward segment to the intermediate segment.

Unless otherwise specified, the designation "housing" also applies to the segmented body. One advantage of the housing is that it blocks belts of tire tread from hurling outwardly toward a nearby motorist or pedestrian after a tire blow-out. Another advantage is that a multi-purpose shield may be affixed to the side wall and easily replaced to protect and renew the exterior side wall. The housing is formed from an anti-static carbon black material having a high temperature tolerance, a high density, ultraviolet stabilized, and a high tinsel modulus for withstanding amplitude of modulation and chemical degradation, the material selected from the group consisting of plastics, polymers, copolymers, polyethylene, polypropylene, rubber, synthetic rubber and combinations thereof. The housing may also be formed from fiberglass or other metals.

The fastening means is essentially a locking mechanism comprising:

a. a cap having an essentially planar outer face and an internally threaded transplanar bore for rotational engagement with the lateral terminus of the girder and the housing further comprising a side wall having an opening;

b. a counter-threaded bolt having a diameter smaller than the transplanar bore and a length sufficient to rotationally engage the axial bore of the girder while inserted through the transplanar bore;

c. a bolt-rotation stop means for preventing over rotation of the bolt engaged with the axial bore of the girder; and d. a cap-rotation stop means for preventing counter rotation of the cap engaged with the bolt rotation stop means and with the girder lateral terminus.

The cap-rotation stop means and the bolt-rotation stop means include the cap planar outer face, with the cap planar outer face further including includes a pair of outstanding stops on opposite sides of the transplanar bore; and the bolt further including a head having an aperture, and at least one outwardly biased divergence cooperating with the stops. The outwardly biased divergence is selected from the group consisting of a spring-biased detent ball within the bolt head and protruding outwardly from an aperture defined by the bolt head, a separate pin inserted through a pin-aperture defined by the bolt head, or any other divergence cooperating with the stops. The outwardly biased divergence comprises a separate pin inserted through a pin-aperture defined by the bolt head, with the pin including an end-stop preventing complete push-through of the pin and at least one outwardly biased surface divergence preventing un-insertion of the pin. Each of the cap outstanding stops includes a domed arch abutting the pin. The outwardly biased surface divergence is selected from the group consisting of a retractable flange biased outwardly from the pin and converging toward an insertion end, a spring-biased detent ball within the pin and protruding outwardly from an aperture defined by the pin, or any other pin having an outwardly biased surface divergence.

The apparatus further comprises the cap planar outer face further including a plurality of perimeter slots, and a tightening tool having a convex exterior surface, a handle having a handgrip, and a plurality of prongs protruding from the tool to rotationally engage with the perimeter slots.

The method of using an apparatus for reducing the wheel-spray and the aerodynamic drag of a wheel-set of a vehicle having a framework with preexisting holes, the method comprising the steps of:

a. providing the apparatus comprising:

i. a three-dimensionally adjustable support infrastructure comprising an anchor plate having a plurality of apertures for receiving two threaded struts; a vertical-lateral plate having two vertical slots for adjustably receiving said struts, and an aperture above the slots; a girder having one end rotatably engaged with the vertical-lateral plate aperture, and another end having an externally threaded lateral terminus also defining an internally counter-threaded axial bore for receiving a fastening means;

ii. a three-dimensionally adjustable housing superstructure comprising at least one box-sleeve having an interior chamber, and two exterior sides defining vertical grooves; a housing substantially screening the wheel-set, said housing comprising a top side having a plurality of perforations for air flow and ice evacuation and a plurality of apertures aligned with the vertical grooves, and a side wall defining at least one forward opening for receiving a first girder and a first of said fastening means, and at least one rearward opening for receiving a second girder and a second of said fastening means, said side wall further comprising a center-point curvature for marking a center placement of the housing in relation to the wheel-set; and at least one stand-on plate having a plurality of apertures aligned with the grooves for affixing the housing between the box-sleeve and the stand-on plate with a U-bolt terminal securing system.

iii. a cap having an essentially planar outer face, an internally threaded transplanar bore for rotational engagement with the lateral terminus of the girder, and a pair of outstanding stops on opposite sides of said transplanar bore from the circumference of said transplanar bore toward the periphery of said cap;

iv. a counter-threaded bolt having a diameter smaller than the transplanar bore, a length sufficient to rotationally engage the axial bore of the girder while inserted through the transplanar bore, and a head larger than the girder axial bore for abutting against the girder axial bore, with the bolt head defining a pin-aperture, wherein the bolt remains engaged with the girder when said cap is removed; and v. a pin inserted through the bolt-head pin-aperture, with the pin having an end-stop preventing complete push-through of the pin and at least one intermediate flange allowing insertion but preventing un-insertion, wherein the pin cooperates with the stops having two domed arches to prevent counter rotation of the cap engaged with the girder lateral terminus and the bolt engaged with the girder axial bore.

The next steps involve:

a. anchoring two of the support infrastructures horizontally to the framework holes with two of the anchor plates, inserting each of the threaded struts through each of the anchor plate apertures, and securing with a terminal securing system;

b. adjusting the support infrastructure laterally and vertically with the vertical-lateral plate slidably adjusted along said struts and the girder;

c. connecting the housing superstructure onto the support infrastructure by sliding the box-sleeve chamber onto the girder lateral terminus;

d. rotatably tightening the cap through the housing side wall opening onto the girder lateral terminus; inserting the bolt through the cap transplanar bore and counter rotatably tightening it into the girder's counter-threaded axial bore until the bolt pin-aperture is within the cap outstanding stops; and inserting the pin through the bolt pin-aperture.

The method further comprises the step of affixing the box-sleeve to the housing and the stand-on plate with a U-bolt terminal securing system, such as U-bolts, fasteners and washers.

The method further comprises the step of adjusting the support infrastructure laterally and vertically by slidably inserting the vertical-lateral plate vertical slots over the struts inwardly or outwardly, and raising or lowering along the struts and then tightening with a terminal securing system; and by rotatably inserting the girder through the vertical-lateral plate aperture and adjusting the girder inwardly, or outwardly within the vertical-lateral plate aperture and then tightening with a terminal securing system.

The method further comprises the step of rotatably tightening the cap with a tightening tool having a concave interior surface cooperating with the cap planar outer face, a handle having a handgrip, and a plurality of prongs for engaging with the cap planar outer face perimeter further comprising a plurality of slots.

The method further comprises the step of preventing substantial rotation that loosens the cap outwardly from the girder lateral terminus by rotatably adjusting the bolt in the opposite direction inwardly onto the girder axial bore to a desired degree, and inserting the pin having an end-point to abut the cap outstanding stops having two domed arches.

Furthermore, the housing increases roadway visibility for the driver of the heavy vehicle and other nearby motorists while traveling over wet surfaces. The housing blocks and redirects the lateral and rearward wheel-spray inwardly from all covered wheel-sets, toward the center of the vehicle's undercarriage, then downwardly and rearwardly toward the ground. The obtuse-angled faces of the forward and rearward sides of the housing reduce the resulting aerodynamic drag of the forward wheel-set by reducing the forward wind resistance and the rearward turbulent wind and rain forces. The apparatus may be installed on both tractors and/or trailers by an unskilled person without the need for drilling or welding the support infrastructure to the vehicle framework.

The user may adjust the housing superstructure and the support infrastructure separately to a customized position horizontally, laterally, and vertically in relation to the wheel-set. Each may be adjusted to an exact degree horizontally, laterally, and vertically during the installation stage. The housing is adaptive to fit a wide range of wheel-set configurations on heavy vehicles such as single and dual tandem wheel-sets and applicable for new factory production vehicles.

The housing further provides ease in installation and adjustment, then provides ease in removal and reinstallation from a standing position for emergency road-side maintenance and/or for routine shop repairs. The housing does not interfere with or otherwise obstruct access to the vehicle's running gear. The adjustable support infrastructure anchors the apparatus to the vehicle, supports the housing screening the wheel-set, and locks the housing into place with a locking mechanism.

One primary object of the present invention is to reduce wheel-generated wheel-spray from all tandem wheel-sets of a heavy vehicle by screening the wheel-sets with a housing superstructure that is horizontally, laterally, and vertically adjustable.

Another primary object of the present invention is to reduce aerodynamic drag from the forward and rearward regions of the tandem wheel-sets.

Yet another object of the present invention is to increase rearward visibility for the heavy vehicle driver on the roadway and to increase visibility for other motorists driving nearby by redirecting the heavy vehicle's lateral and rearward wheel-spray into the undercarriage, then downwardly and away from the path of the other motorists.

Another primary object of the present invention is to allow a user to customize the positioning of the apparatus with a three-dimensionally adjustable support infrastructure horizontally, laterally, and vertically in relation to the wheel-sets of the heavy vehicle.

Another primary object of the present invention is to allow a user to customize the positioning of the housing with a three-dimensionally adjustable housing superstructure and support infrastructure horizontally, laterally, and vertically in relation to the wheel-sets of the heavy vehicle.

Another primary object of the present invention is to allow a user to customize the installation and positioning of the housing with a "no drill through" and "no welding to" the heavy vehicle frame and/or trailer frame.

Another object of the present invention is to provide a three-dimensionally adjustable housing superstructure including a housing, a stand-on plate, an X-ring, an O-ring, U-bolts, fasteners, and a box-sleeve for receiving a support infrastructure girder.

Yet another object of the invention is to provide a first attenuation (pre-load) X-ring spacer to create a vibration reducer and friction block between the box-sleeve and the vertical-lateral plate, and a second attenuation (post-load) O-ring spacer to create a vibration reducer and friction block between the box-sleeve and the housing side wall, thereby reducing vibration transfer from the vehicle to the housing.

Another object of the invention is to provide for ease in installation, adjustment, and removal of the housing superstructure from a standing position, such as to accommodate an emergency roadside repair and/or a routine repair and maintenance of the vehicle.

Yet another object of the invention is to provide a locking cap for securing a housing superstructure onto the girder (and consequently to the support infrastructure) and for preventing the locking cap from detaching from the same by using a resistance locking pin that abuts the cap's domed arches during rotational movement.

Yet another object of the invention is to provide a counter-threaded locking bolt having counterclockwise rotational movement so that after interlocking with the locking pin, any vibration will automatically tighten the locking cap against the housing side wall to prevent the cap from loosening whenever the locking pin abuts the cap's domed arches.

Another object of the invention is to provide a tightening wrench for tightening or loosening the locking cap onto the girder and for providing torque to tighten and secure or loosen and remove the locking cap from the girder and the housing.

Yet another object of the invention is to provide a box-sleeve defining a chamber for receiving the girder, and having a plurality of curved exterior grooves, wherein the grooves provide a template for precise drilling of the housing apertures in relation with the stand-on plate and the box-sleeves, and allows for positioning and securing a plurality of rectangular U-bolts; wherein the housing is used to bond between the box-sleeve and the stand-on plate forming a superstructure, and to provide ease in installing or removing and reinstalling the housing on the girder and support infrastructure.

Another object of the invention is to provide a unitized housing superstructure, wherein the superstructure bonds the housing between the box-sleeve and the stand-on plate, so that the stand-on plate provides a platform for extending the vertical standing reach for a user.

Another object of the invention is to provide a housing having aerodynamic forward and rearward obtuse-angled sides to reduce drag by reducing forward wind resistance of the previously exposed flat face of the wheel-set and reducing turbulence created rearward of the wheel-set.

Another object of the invention is to provide a housing that directs wheel-spray toward the vehicle undercarriage and downward due to the housing's obtuse-angled rearward face.

Yet another object of the invention is to provide a housing having air-flow perforations to dissipate vacuum generated by wheel-spin and to evacuate ice.

Another object of the invention is to provide an interlocking segmented housing as an alternative to a non-segmented housing, for adapting to multiple size specifications for all wheel-set configurations.

Another object of the invention is to provide a housing having a side wall formed from a hard or soft composite material.

Another object of the invention is to provide a housing made from a material selected from the group consisting of high tensile modulus polymers, rubber, synthetics, fiberglass, and/or metal or any other combination or mixture thereof, with the material having a high pull-apart durability and resistance to cracking.

Another object of the invention is to provide a housing made from a material selected from the group consisting of with high lubricity polymers, rubber, synthetics, fiberglass and/or metals or any other combination or mixture therefore, with the material having impact modifiers to resist internal and side impact.

Yet another object of the invention is to provide an electrostatic dissipative housing with carbon black additive and/or shredded stainless steel threads of fillers and/or fibers that further dissipate electrostatic radiation.

Yet another object of the invention is to provide housing formed from a polymer, rubber, natural or synthetic materials, and/or metals for withstanding ultraviolet radiation, extreme heat and cold, and amplitudes of modulation (vibration) due to long-term roadway vibration, including the capability for withstanding chemical degradation due to common roadway chemicals and pollutants mixing with wheel-spray.

Another object of the invention is to provide a side wall to which a replaceable protective shield or other attachments may be affixed.

Another object of the invention is to provide a protective shield that can be attached to the housing side wall with a banded set of discs that interconnect the shield with the housing side wall.

Other objects will be apparent from a reading of the written description disclosed herein, together with the claims.

BRIEF DESCRIPTION OF THE SEVERAL VIEWS OF THE DRAWINGS

FIG. 7 depicts an isolated banded disc set.

FIG. 8 depicts a cut away side elevation view of an exterior protective shield attached to the housing side wall with the banded disc sets.

FIG. 9 depicts a cut away top view of the shield attached to the housing side wall with the banded disc sets.

FIG. 10 depicts an exploded view of the shield with its corresponding T-slots and the banded disc sets.

FIG. 11 depicts an exploded view of the housing side wall having a plurality of T-slots, and openings for receiving a first girder and first fastening means and a second girder and second fastening means.

FIG. 15 depicts a bottom perspective view of FIG. 14.

FIG. 16 depicts an isolated view of a saw-tooth clamp locked into place with a locking port having dual locking slots.

FIG. 17 depicts an isolated view of a locking port having dual locking slots.

FIG. 18 depicts an isolated view of the saw-tooth clamp.

FIG. 32 depicts a cross-section view of the locking mechanism and wrench.

FIG. 33 depicts a top plan view of the locking mechanism.

Figure 1:
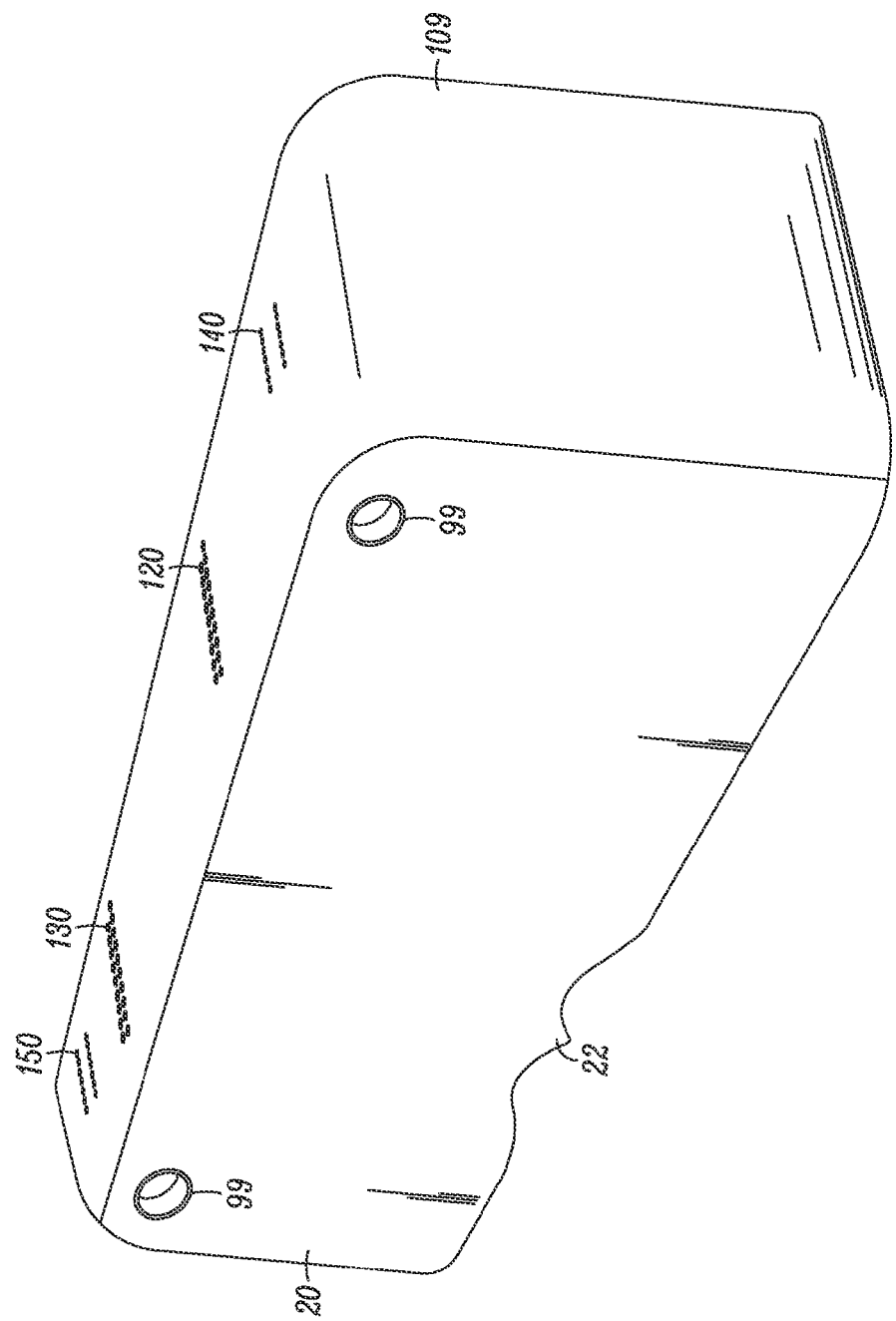
FIG. 1 depicts a perspective view of the housing.
Figure 2:
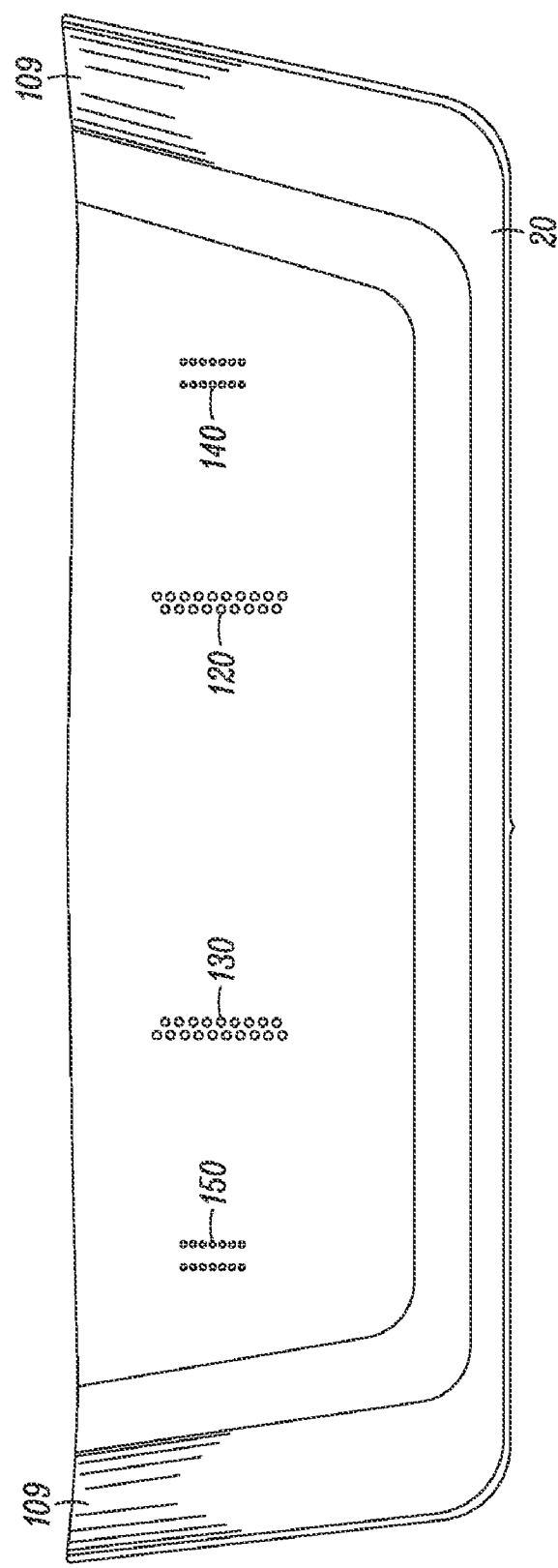
FIG. 2 depicts a bottom plan view of FIG. 1.
Figure 4:
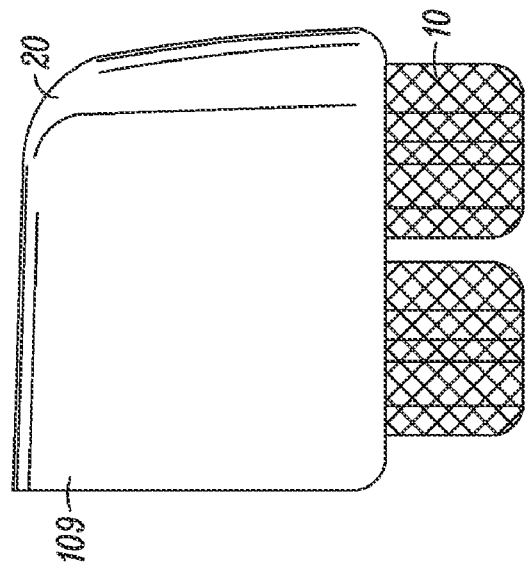
FIG. 4 depicts a rear elevation view of FIG. 1 with the unclaimed tandem wheel-sets.
Figure 3:
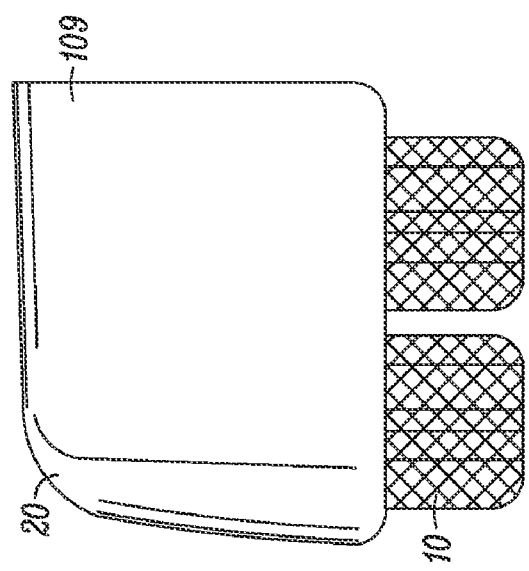
FIG. 3 depicts a front elevation view of FIG. 1 with the unclaimed tandem wheel-sets.
Figure 5:
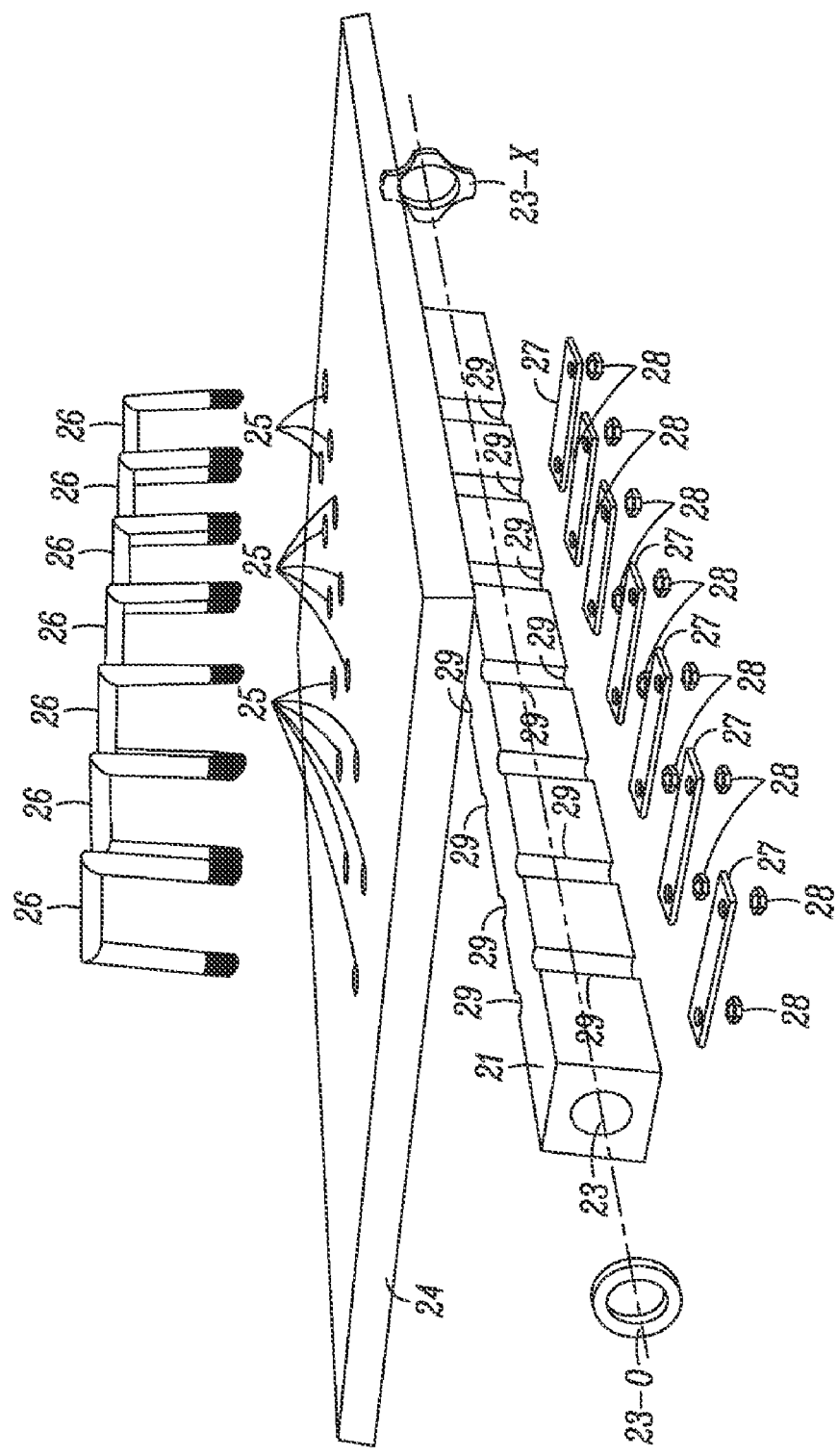
FIG. 5 depicts a perspective view of the box-sleeve, the stand-on plate, the X-attenuation ring, the O-attenuation ring, the U-bolts and the fasteners.
Figure 6:
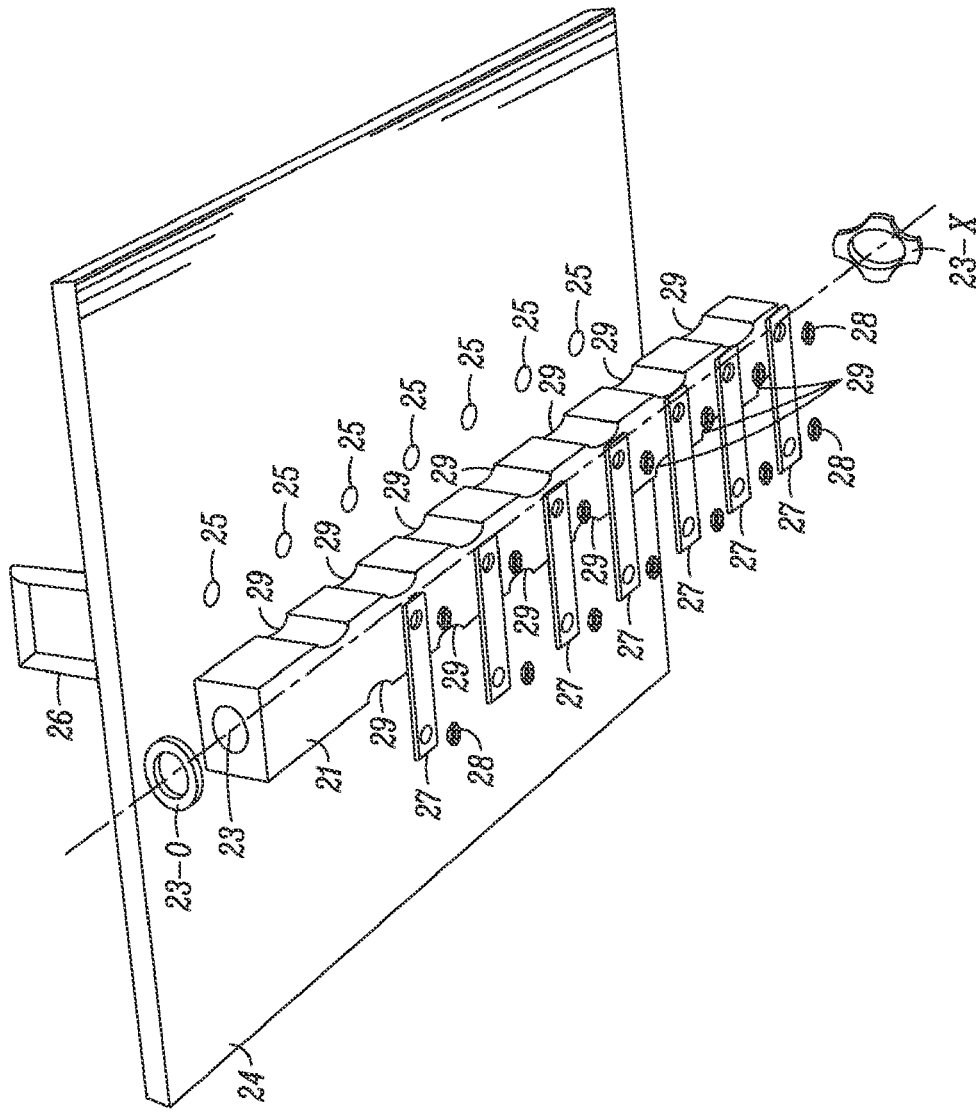
FIG. 6 depicts a bottom perspective view of FIG. 5.
Figure 12:
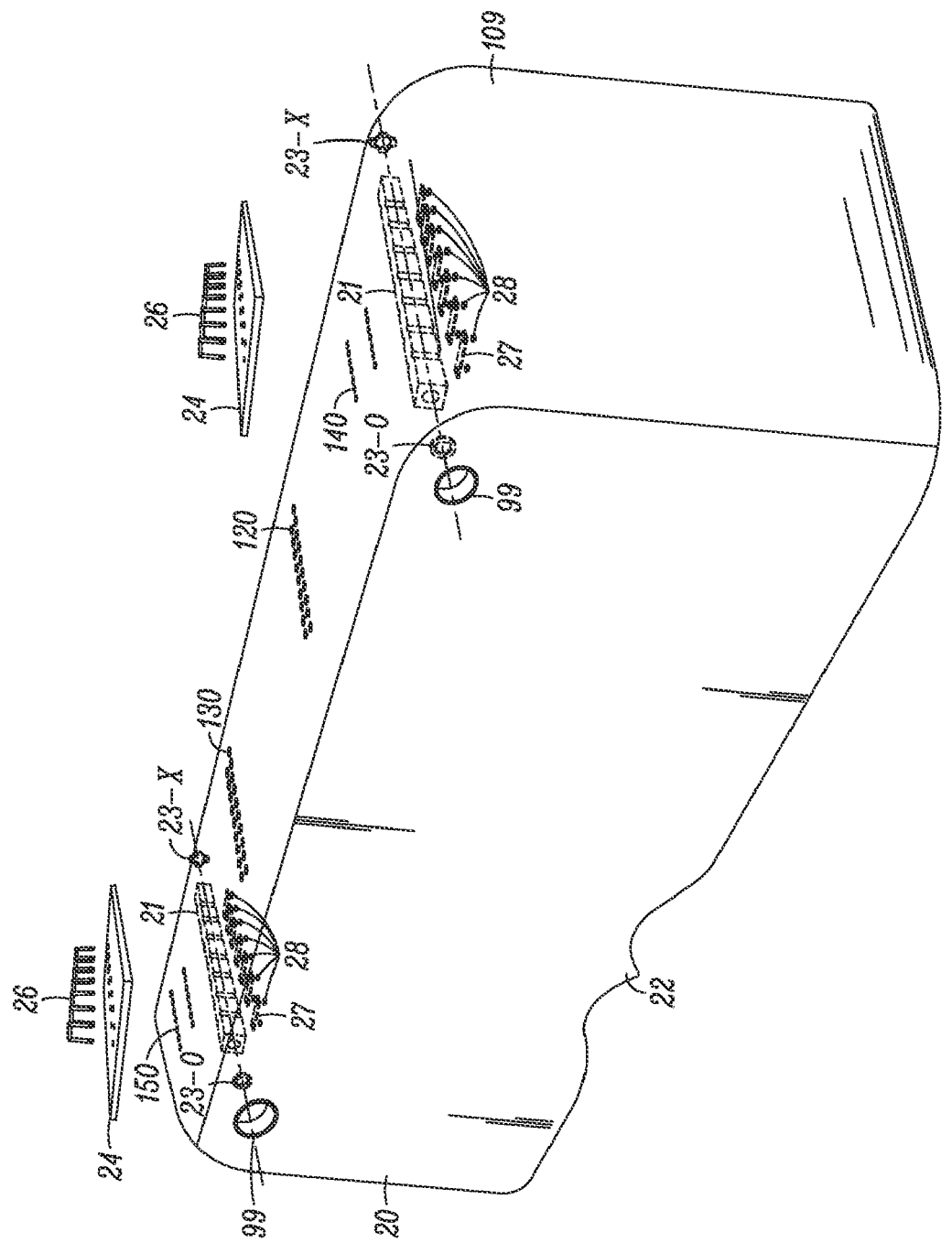
FIG. 12 depicts a perspective view of the housing superstructure having the box-sleeves, the housing, the stand-on plates, the X-rings, the O-rings, the U-bolts and the fasteners and air flow apertures and U-bolt apertures.
Figure 13:
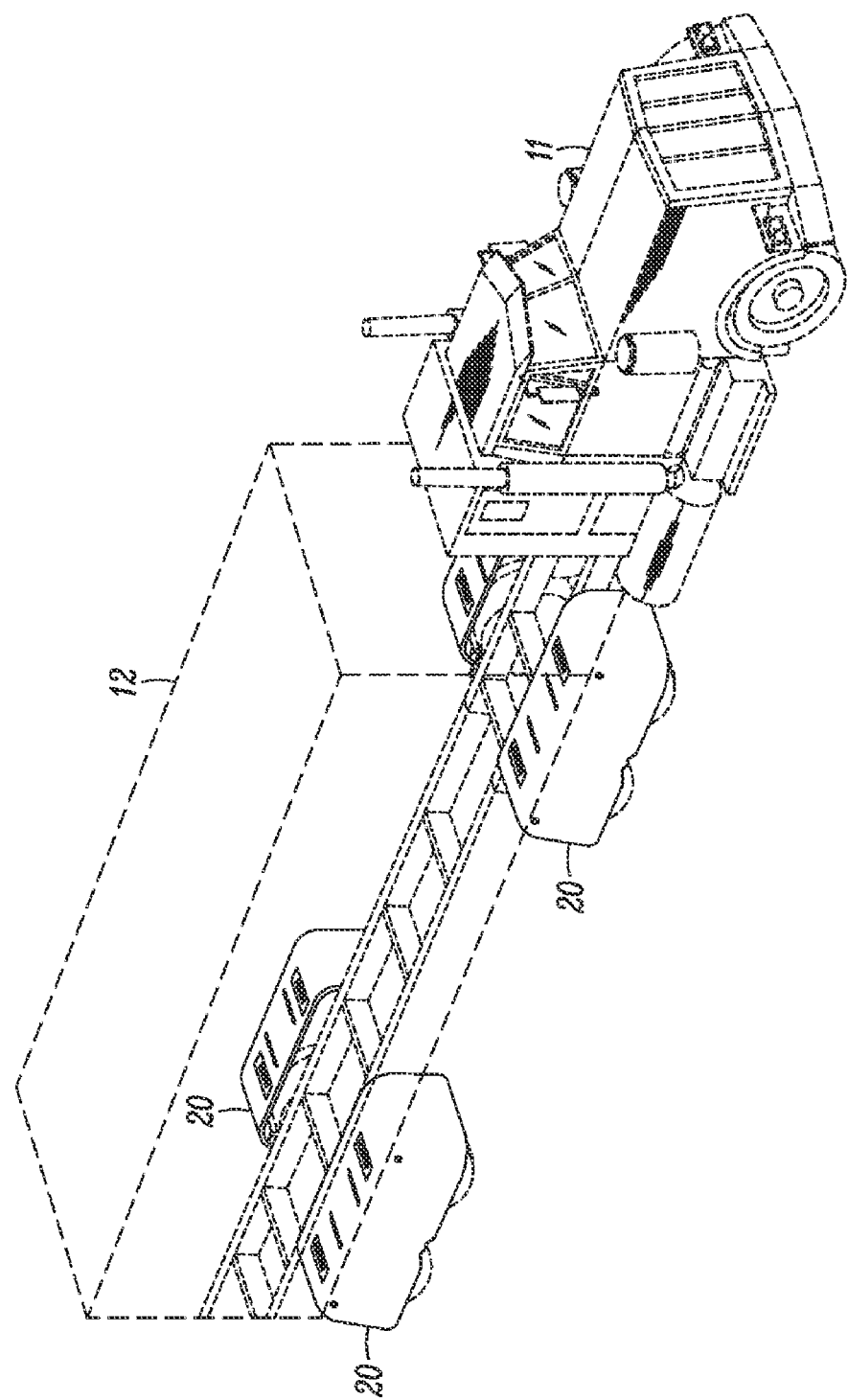
FIG. 13 depicts a perspective view of the apparatus installed on the unclaimed truck and trailer.
Figure 14:
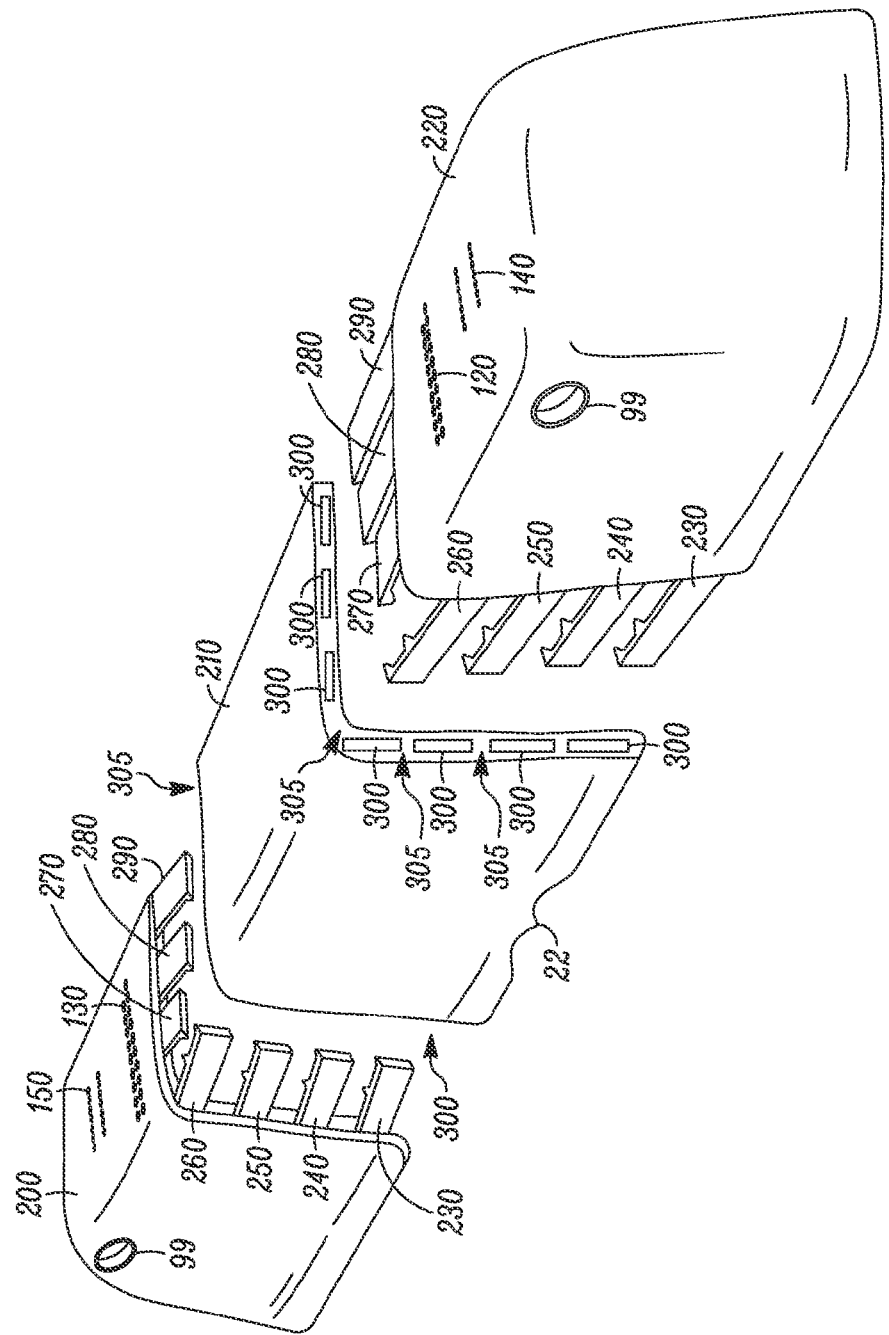
FIG. 14 depicts a perspective view of the three housing segments with air flow apertures and U-bolt apertures.
Figure 19:
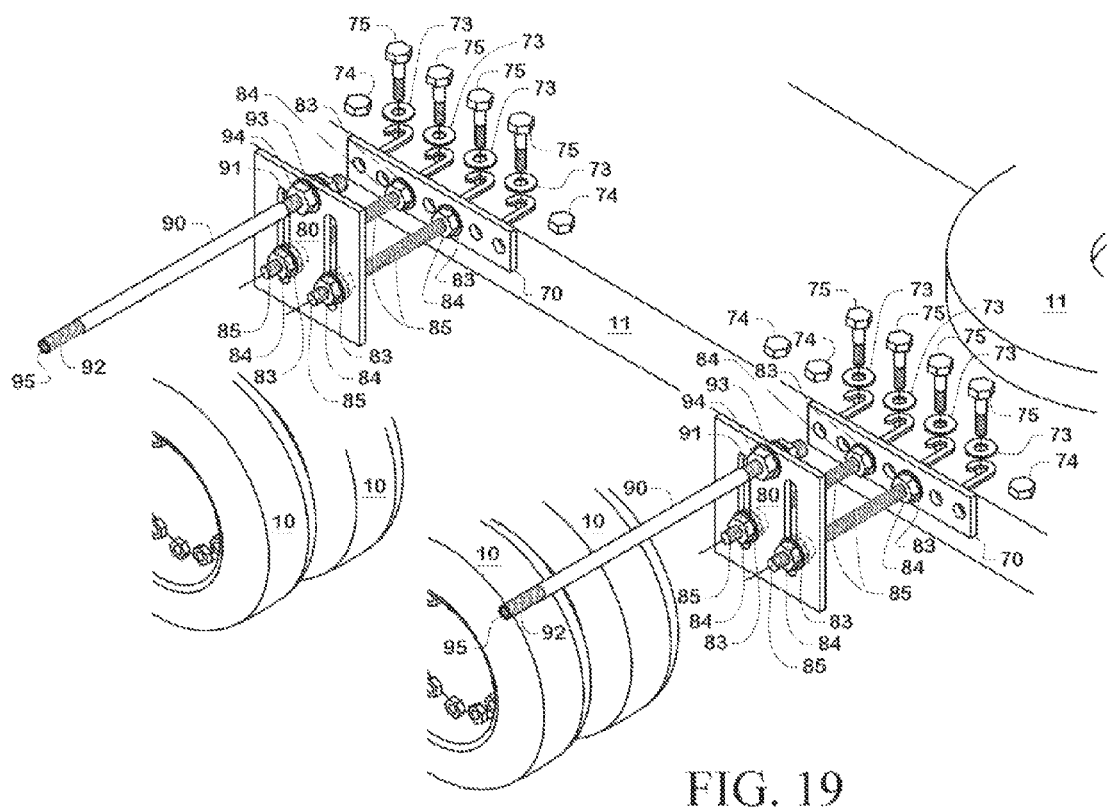
FIG. 19 depicts an exploded view of the three-dimensionally adjustable support infrastructure for a truck, with unclaimed truck framework and unclaimed tandem wheel-sets.
Figure 20:
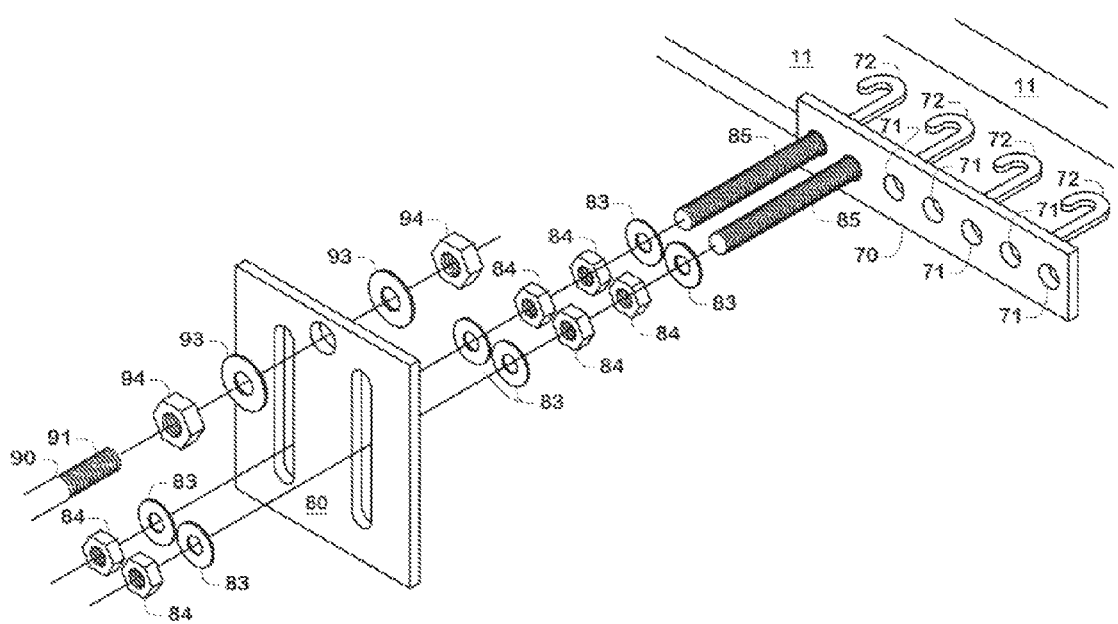
FIG. 20 depicts an exploded view of the support infrastructure having the anchor plate, the struts, the vertical-lateral plate, the girder, and the washers and fasteners and the unclaimed truck framework.
Figure 21:
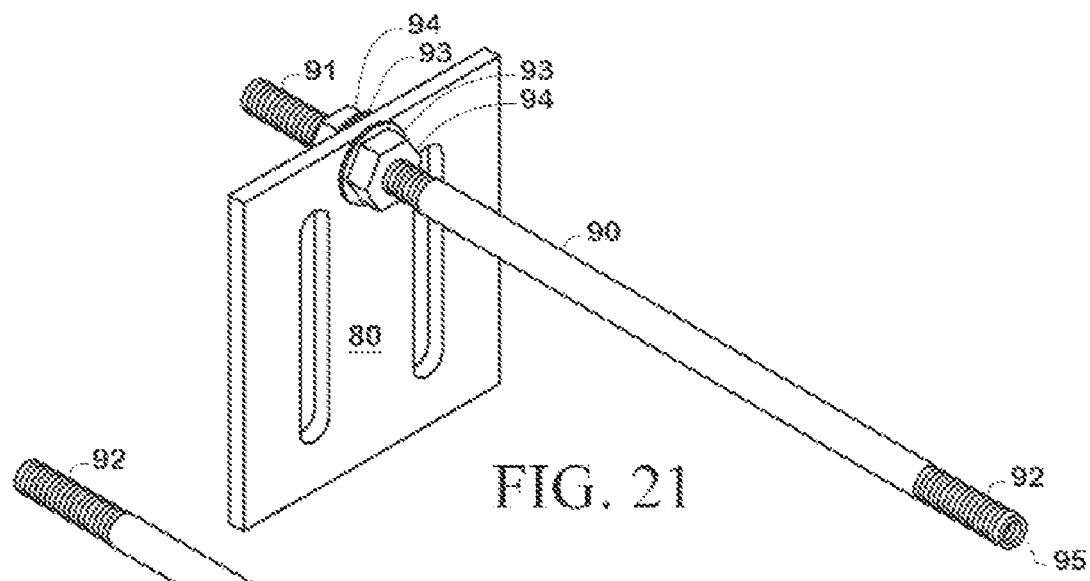
FIG. 21 depicts a front perspective view of the vertical-lateral plate and the girder.
Figure 22:
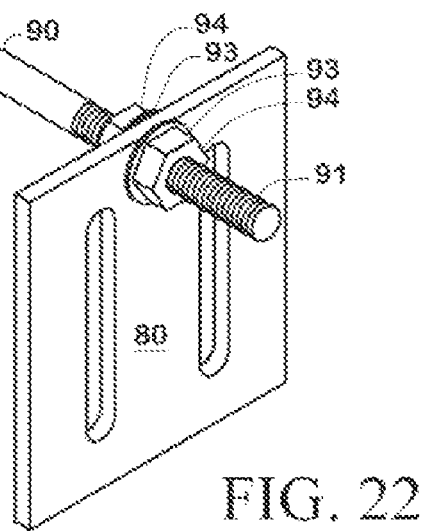
FIG. 22 depicts a rear perspective view of the vertical-lateral plate and the girder.
Figure 23:
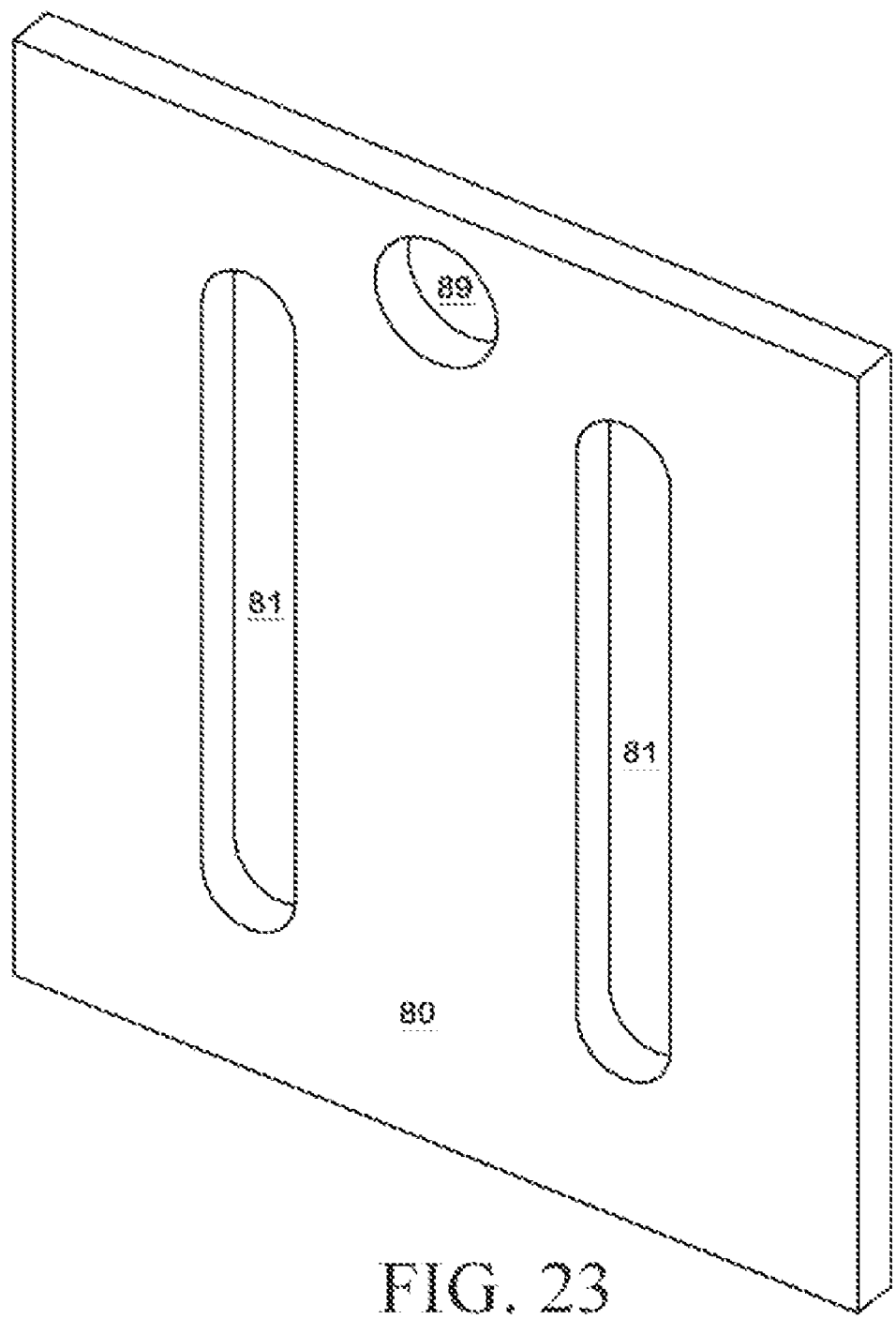
FIG. 23 depicts a perspective view of the vertical-lateral plate.
Figure 24:
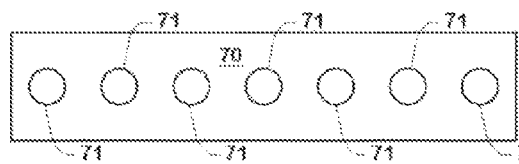
FIG. 24 depicts a front elevation view of the J-hook anchor plate.
Figure 25:
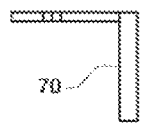
FIG. 25 depicts a side elevation view of FIG. 24.
Figure 26:
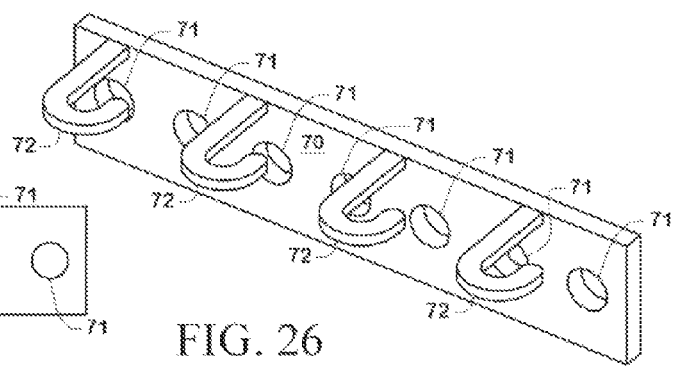
FIG. 26 depicts a rear perspective view of FIG. 25.
Figure 27:
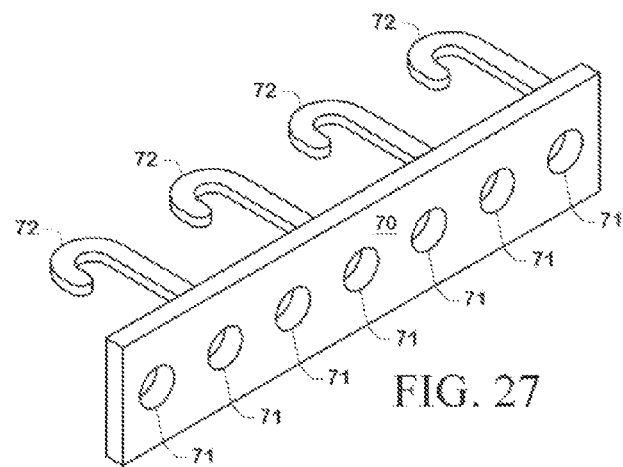
FIG. 27 depicts a perspective view of FIG. 26.
Figure 28:
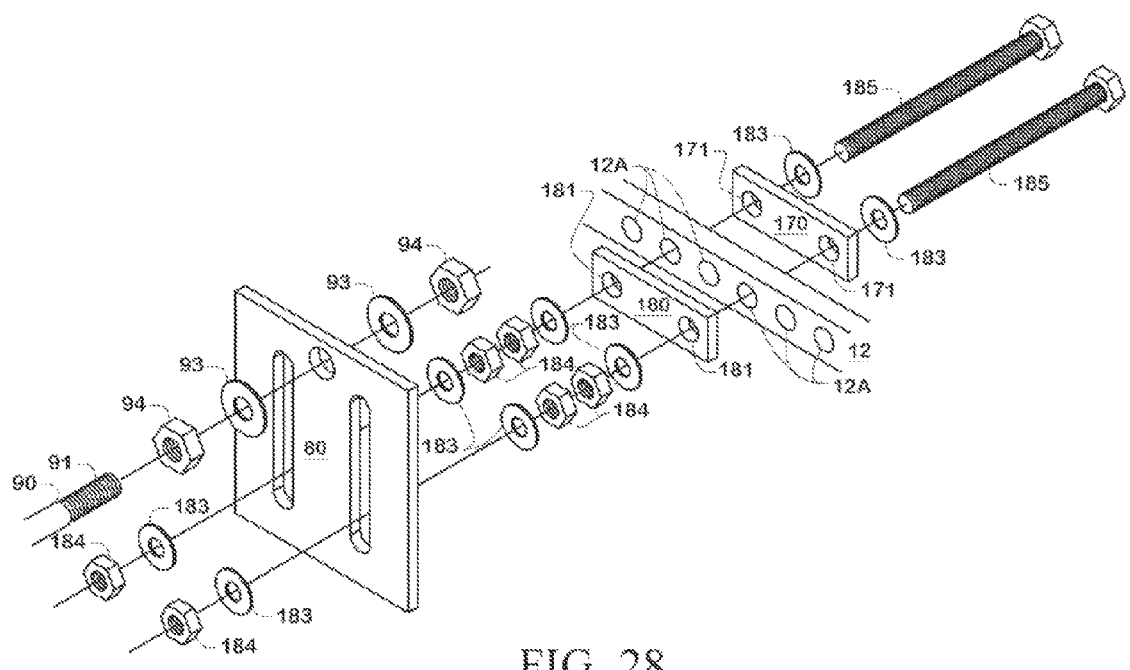
FIG. 28 depicts an isolated perspective view of the support infrastructure having two anchor plates for the trailer and the unclaimed trailer framework, the unclaimed trailer, and the unclaimed trailer tandem wheel-sets.
Figure 29:
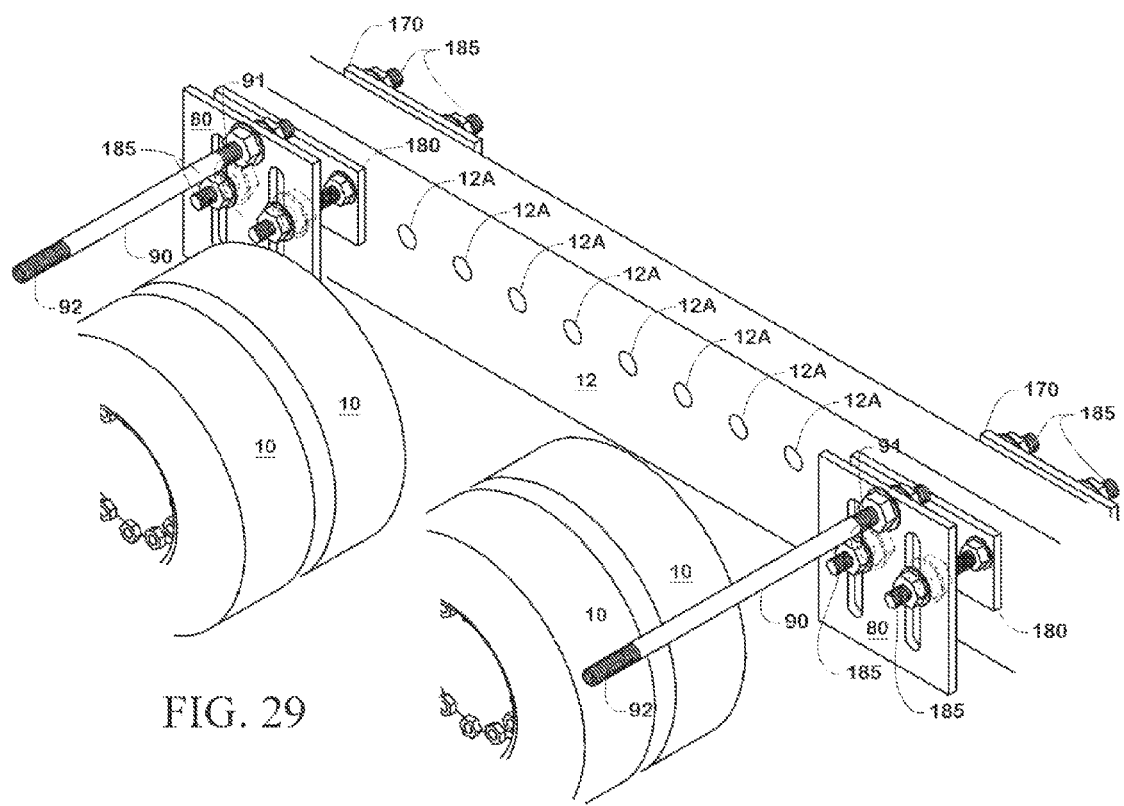
FIG. 29 depicts a top perspective view of FIG. 28 installed onto the unclaimed trailer framework and unclaimed tandem wheel-sets.
Figures 30, 31:
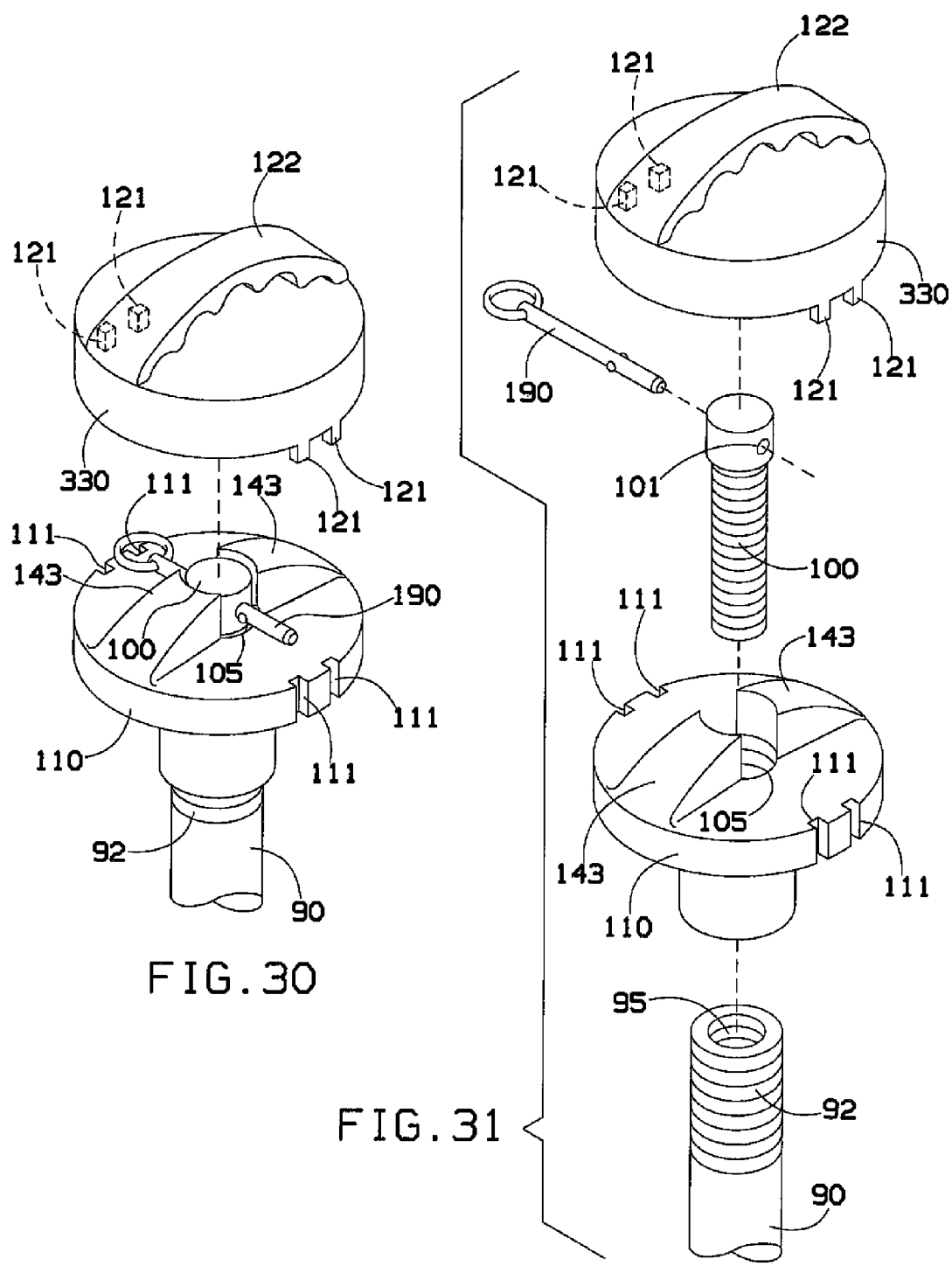
FIG. 30 depicts a perspective view of the locking mechanism and wrench.
FIG. 31 depicts an exploded view of the locking mechanism and wrench.
Figure 34:
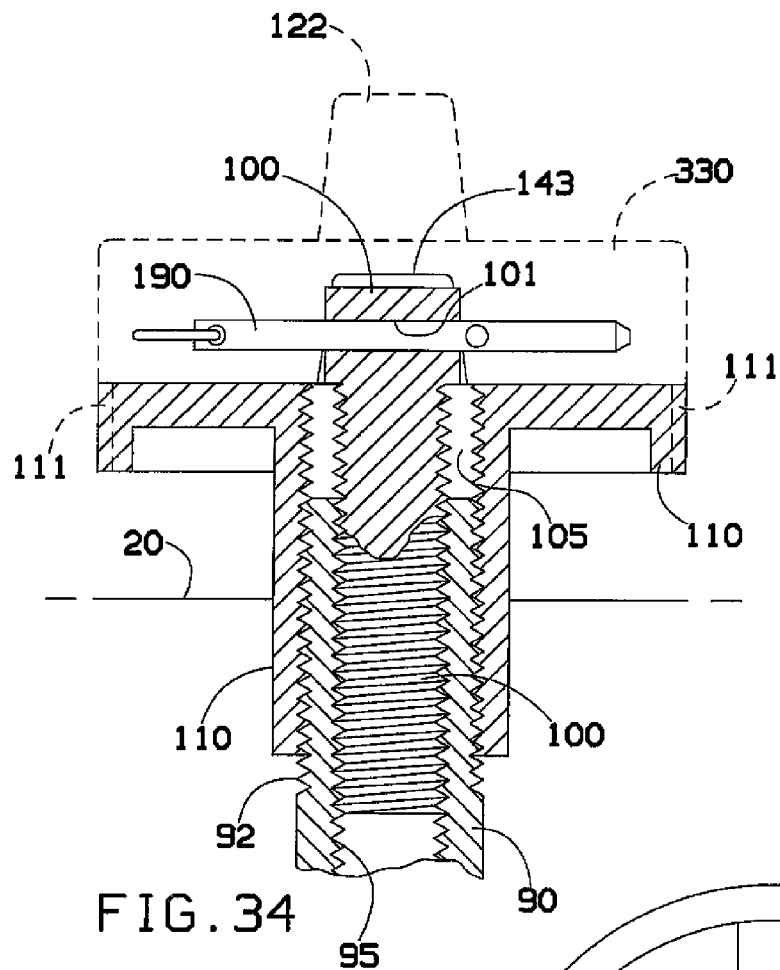
FIG. 34 depicts a side cut-away view of the locking mechanism and wrench.
Figure 35:
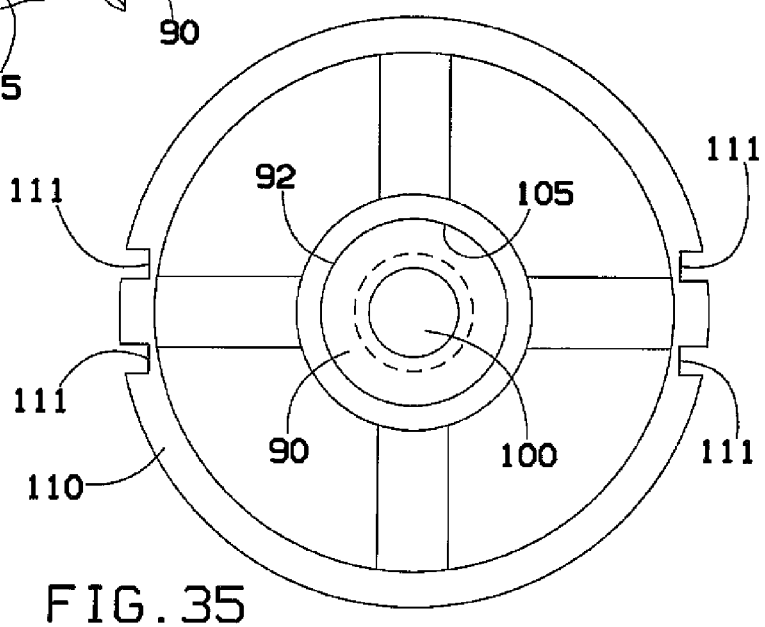
FIG. 35 depicts a bottom plan view of the locking mechanism.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply for the following terms (and derivatives thereof):

The term "vehicle" essentially means any automobile, tractor, or trailer towed thereby capable of producing wheel-spray; the term "heavy vehicle" essentially means a transport truck, a tractor trailer, a semi-truck, a tractor, a cargo trailer and a multi-configured cargo trailer.

The term "wheel-set" essentially means a wheel and respective tire of a vehicle including "tandem wheel-sets" and the singular or plural form of "wheel-set"; the term "tandem wheel-sets" essentially means a plurality of wheel-sets, such as those often found on a heavy tractor vehicle; typically, tandem wheel-sets refers to at least two wheels arranged side-by-side (co-axially) or tread-to-tread (co-linearly) or both.

The term "wheel-spray" essentially means the plurality of fine droplets of water or other liquid (i.e., mist or frozen mist or snow) and/or other finely particulate matter, such as produced by the interaction of tires on a surface; for example, wheel-spray may include the spray of mist produced by a vehicle traveling on a roadway during or after rain, snow, sleet and/or chemical spill, and/or including any particulate debris such as mud, small rocks or pebbles.

The term "ice evacuation" essentially means the evacuation or removal of slush, ice, mud, debris or a combination of the same from the housing top side perforations. The term "perforation" essentially means an aperture, hole or other opening.

The term "retrofit" essentially means to install, cover, fit or adapt the disclosed invention on a suitable vehicle new or used, and/or installed directly from the original manufacturer.

The term "frame" and/or "framework" essentially means the undercarriage of vehicle, typically above the wheel's rim line.

The term "infrastructure" essentially means the interconnected components connected to the vehicle framework and supporting the housing superstructure.

The term "superstructure" essentially means the interconnected components forming the housing superstructure for connecting to the support infrastructure and for shielding the wheel-set(s).

The term "customized" essentially means capability of adjusting to a user's own specifications within the parameters of the device.

The term "forward" essentially means oriented or located more toward the front end of a vehicle or wheel-set(s) (relative to a point of reference); the term "rearward" essentially means oriented or located more toward the rear end of a vehicle or tandem wheel-sets (relative to a point of reference).

The term "lateral" essentially means oriented or located further from the longitudinal axis of a vehicle (relative to a point of reference); the term "proximal" means oriented or located closer to the longitudinal axis of a vehicle (relative to a point of reference).

The term "macro-lateral adjustment" essentially means that the overall apparatus may be exactingly adjusted laterally.

The term "micro-lateral adjustment" essentially means that the overall apparatus may be most-exactingly adjusted laterally.

The term "screening" and/or "screen" essentially means providing a substantial barrier or housing between the wheels (or wheel-set) of a vehicle and the environment outside of the vehicle wheel-set(s), at least sufficient to prevent a substantial portion of wheel-spray from departing the housing and sufficient to block belts of tire tread from hurling outward into traffic; screening typically includes providing a barrier around portions of the wheels (or wheel-set) that do not interfere with the functioning of the wheel(s), especially providing a barrier around the forward, lateral, rearward and upper aspects of the wheel (or wheel-set) but not the interior aspects of the wheels (or wheel-set).

The term "three-dimensionally adjustable" essentially means adjustable horizontally (forward-to-rearward along a vehicle), laterally (further-to-closer to the longitudinal axis of a vehicle), and vertically (further-to-closer to the ground surface).

The term "reduce" essentially means to suppress or eliminate.

The term "attenuation" essentially means to dampen, reduce or attenuate.

The term "terminal securing system" essentially means the element(s) necessary to accomplish or complete the securing or fastening function intended; for example, for a fastener having external threads (such as a bolt), the terminal securing system could include a nut (or lock-nut) accompanied by washer(s) (or locking-washers) and/or a lock plate (having the aperture(s) required for impaling by a plurality of bolts).

The term "pre-load" essentially means loading a first attenuation ring, such as a X-ring spacer, before sliding the box-sleeve over the girder. The term "post-load" essentially means loading a second attenuation ring, such as a O-ring spacer, after sliding the box-sleeve over the girder.

The term "clamp" means a saw-tooth or a wedge clamp extending (or protruding) from a structure for clamping (and interlocking) into a clamp port and into dual locking slots of other structure.

The term "aerodynamic drag" refers to the resistance of a moving object or vehicle component traveling through atmospheric conditions, a resistance that increases and multiplies as the speed of the object or vehicle increases.

The term "aerodynamic turbulence" refers to the pull from behind on a moving object or vehicle component traveling through atmospheric conditions, a pull that increases and multiplies as the turbulence from behind the object or vehicle component increases.

The term "efficiency" essentially means a method of reducing drag.

The term "shield" essentially means any multi-purpose protective fabric, material, or device that can be secured or affixed to the side wall of the housing.

The term "inertia lock" refers to the locking mechanism when a locking cap, two domed arches, a locking bolt, and a locking pin share the same axis and their clockwise and counterclockwise movements act independently to intersect with two oppositional cross members to create a fastening system.

A support infrastructure anchors the apparatus to the vehicle framework (11) without the need for drilling through or welding to the framework (11) because it utilizes the framework's (11) preexisting drilled holes. Once anchored and adjusted along the framework horizontally, the support infrastructure may be further adjusted laterally and/or vertically in relation to the vehicle to allow customized positioning of a housing superstructure having a housing (20) that screens the wheel-set (10). The support infrastructure comprises (includes) an anchor plate (70), two threaded support struts (85/185), a vertical-lateral plate (80), a girder (90), and a plurality of terminal securing systems, such as circular washers (83/183/93) and fastening nuts (84/184/94). The support infrastructure and its components can be made from various materials such as steel.

The anchor plate (70) is anchored to the vehicle framework (11) without the need for drilling or welding anywhere on the vehicle framework (11) using the framework's preexisting holes, followed by inserting frame bolts and locking washers for securing the anchor plate (70) to the framework (11). In one embodiment, such as one including a heavy vehicle, the anchor plate (70) comprises a plurality of perpendicular J-hooks (72) that are aligned with the preexisting framework holes and anchored to the heavy vehicle framework (11) with a plurality of locking washes (73) and a plurality frame bolts (75). The J-hook anchor plate is configured such that anchor plate may be turned upward above or downward below the horizontal line of the framework mounting bolts, thus providing a maximum vertical range for the lateral placement of the struts in relation to the housing superstructure. Once anchored, only the J-hooks (72) touch the framework (11) so that a small space is left between the anchor plate (70) and the framework (11) to accommodate the struts and terminal securing system.

Adjusting the support infrastructure horizontally along the framework (11) requires that the anchor plate (70) further comprise a plurality of center apertures (71) for receiving the two struts (85) that are secured with two sets of locking washers (83) and fastening nuts (84). The struts (85) are inserted through the apertures (71) before the J-hooks (72) are anchored to the framework (11).

In another embodiment, such as one including a trailer, the anchor plate comprises an interior anchor plate (170) defining a plurality of apertures (171), and an exterior anchor plate (180) defining a plurality of center apertures (181). In this instance, the interior anchor plate (170) is aligned horizontally along the interior side of the trailer's preexisting holes (12A) and the exterior anchor plate (180) along the exterior side of the trailer's preexisting holes (12A), and inserting the two struts (185) through the interior and exterior apertures (171 and 181), respectively, thereby extending the struts (185) laterally from the exterior anchor plate (180). The struts (185) are then secured and anchored to the trailer framework (12) with a plurality of locking washers (183) and fastening nuts (184) tightened against the external face of the anchor plate (180).

Adjusting the support infrastructure laterally is essentially the same for both heavy vehicle and trailer embodiments. Once secured to the anchor plate (70/170/180), each strut (85 or 185) is inserted through the elongated vertical slots (81) of the vertical-lateral plate (80). Then the vertical-lateral plate (80) is pushed or pulled inwardly or outwardly from the vehicle to a desired position along the struts. The two struts (85/185) are then secured with another four sets of locking washers (83/183) and fastening nuts (84/184) against each side of the vertical-lateral plate (80).

Adjusting the support infrastructure vertically is essentially the same for both heavy vehicle and trailer embodiments. Once secured to the anchor plate (70/170/180), the vertical-lateral plate (80), with the two struts (85/185) already inserted through the vertical-lateral plate (80) vertical slots (81), is raised or lowered along the struts to a desired position. It should be noted that adjustment of the vertical-lateral plate (80) laterally and vertically may occur simultaneously.

The vertical-lateral plate (80) further includes a central aperture (89) near the top of the vertical-lateral plate (80) for receiving an externally threaded proximal end (91) of the girder (90). The vertical-lateral plate may be installed with the central aperture (89) turned either upward above or downward below the horizontal line of the struts, thus providing a maximum vertical range for the lateral placement of the girder in relation to the housing superstructure. The girder (90) may further macro-laterally adjust the positioning of the support infrastructure, and subsequently the housing superstructure, inwardly and outwardly with respect to the wheel-set by screwing the proximal end (91) into the vertical-lateral plate (80) aperture (89) to a desired position. This positioning is secured with locking washers (93) and fastening nuts (94) on both sides of the vertical-lateral plate (80). These fastening nuts (94) and locking washers (93) create a terminal securing system that secures the vertical-lateral plate (80) in the desired vertical positioning and lateral positioning of the support infrastructure. The housing superstructure is then suspended on the girder (90) and is supported by the support infrastructure.

The girder (90) is essentially a tubular steel shaft having about a 1¼ inch diameter, with the girder (90) further comprising an externally threaded lateral terminus (92) defining an internally counter-threaded axial bore (95). The external threads of the proximal end (91) and the lateral terminus (92) extend about six inches from each end point. Once assembled, the girder (90) is perpendicular to the vehicle, and further extends to approximately thirty inches outwardly including the vertical-lateral plate (80). The external threads of the girder (90) lateral terminus (92) interlock with the locking cap (110) having a threaded transplanar bore (105).

The removable housing superstructure essentially comprises a housing (20) attached between two box-sleeves (21) and two stand-on plates (24), wherein the housing superstructure connects to two girders (90). The housing superstructure is further adjusted horizontally, laterally, and vertically, and is secured with a locking mechanism. The box-sleeve (21) and stand-on plate (24) can be made from various polymers.

Each box-sleeve (21) is an approximately four-inch by four-inch by twenty-three inch polymer sleeve having a plurality of exterior curved grooves (29), and an interior chamber (23) with an opening at each end for receiving the girder (90) slidably therethrough. The chamber (23) is one and one-quarter inches in diameter. The box-sleeve (21) attaches to and protects the underside of the top of the housing (20), supporting the housing (20) and the stand-on plate (24) on the girder (90). It also encases and protects the girder (90) so that the housing superstructure can connect to the support infrastructure. The box-sleeve (21) grooves (29) provide a template for aligning and positioning the U-bolts (26) for insertion through the stand-on plate (24) and housing (20). Prior to assembly, the housing (20) should be positioned on the girders (90) and the box-sleeves (21), and using the box-sleeve (21) grooves (29) as a template, markings are made along each of the box-sleeve (21) grooves (29) to properly identify the points to drill for the housing top side apertures (140 and 150). These top side apertures (140 and 150) correspond with the stand-on plate (24) matching apertures (25). In one embodiment, the box-sleeve (21) includes seven pairs of exterior grooves (29) that correspond with a forward set of apertures (140) and/or rearward set of apertures (150) of housing (20) top side apertures (140 and 150), with the stand-on plate (24) having a corresponding set of seven pairs of apertures (25).

The box-sleeve (21) allows a fixed vertical adjustment of the housing superstructure due to the box-sleeve's (21) height. When the girder (90) is slidably inserted through the chamber (23), the center of the chamber (23) is aligned with the vertical-lateral plate (80) aperture (89), resulting in the top of the vertical-lateral plate (80) being level with the top of the box-sleeve (21). The means for adjusting the housing superstructure vertically using the box-sleeve (21) is dependent upon the vertical adjustment of the vertical-lateral plate (80). The box-sleeve (21) essentially lifts the housing (20) above the vertical-lateral plate (80). Without the box-sleeve (21), the housing (20) would abut the vertical-lateral plate (80) after the housing (20) is connected to the girder (90). The housing superstructure may be adjusted horizontally and laterally by positioning and using the box-sleeve (21) grooves (29) as a drilling template in a desired location under the housing (20) top side for drilling the apertures (140 and 150) into the housing (20) top side.

The stand-on plate (24), while serving as a standing platform on top of the housing (20), also reinforces and provides structural support to the top of the housing superstructure. The stand-on plate (24) is approximately a seventeen-inch by twenty-three inch by three-quarter inch polymer plate having a plurality of apertures (25). These apertures (25) provide for the insertion of the seven removable rectangular U-bolts (26) spaced along the top of the stand-on plate (24) down through the stand-on plate (24) apertures into the corresponding housing (20) top side apertures (140 and 150) and along the corresponding exterior grooves (29). The U-bolts (26) are secured with corresponding rectangular locking washers (27) having two holes for the U-bolts (26) and a pair of steel fastening nuts (28). In one embodiment, the plurality of apertures has seven pairs of one-half inch perforations (25). It should be noted that terminal securing system that secures the housing (20) to the stand-on plate (24) and the box-sleeve (21) is not limited to the U-bolts. Any other comparable fastener may be substituted.

A first attenuation ring, such as a pre-load X-ring spacer (23-X), is essentially a one-inch deep by four-inch wide X-shaped polymer spacer that compresses to form a vibration reducer and friction block between the proximal end of the box-sleeve (21) nearest the vehicle frame and the housing (20). A second attenuation ring, such as a post-load O-ring spacer (23-O), is essentially a one-inch deep by four-inch wide circular polymer spacer that compresses to form a vibration reducer and friction lock between the lateral end of the box-sleeve (21), the housing (20), and the locking cap (110).

When installing the housing (20), one will need to use two box-sleeves (21) and two stand-on plates (24) to correspond with the housing (20) top side's forward and rearward apertures (140, 150), in addition to drilling two openings (99) in the housing (20) side wall for receiving the encased girders (90). Two girders (90) will also be needed to support the housing superstructure, wherein the housing (20) screens the wheel-set(s) (10). Once the housing (20) has been attached between the box-sleeves (21) and the stand-on plates (24) to form the housing superstructure, a user can easily install or remove the housing superstructure from the girders (90) from a standing position.

The housing (20) has a four sided body, having a top side, a side wall, a forward (or front) side (109), and a rearward (or back) side (109). The interior of the housing (20) is open and faces inwardly to enclose the wheel-set (10). The side wall defines two openings (99), with a forward opening (99) located near the forward and upward section of the side wall, and a rearward opening (99) located near the rearward and upward section of the side wall. The side wall further includes a center-point curvature (22) defined in the side wall designating the center-point (22) of the housing (20). The side wall may also extend downwardly near the wheel-set's lowest rim line.

The housing (20) comprises a forward side (109) angled to reduce the aerodynamic drag caused by the exposed flat tire surface of the wheel-set (10) and by the increased drag resulting from the vehicle's increasing speed moving forward. The housing (20) further comprises a rearward side (109) also angled to reduce the rearward pull caused by the aerodynamic turbulence created by the wheel-set (10) disrupting the air flow from the previously exposed flat surface of the wheel-set (10) and from the vehicle's increased speed moving forward.

The housing (20) further comprises a top side having a plurality of perforations for air flow and/or ice evacuation. The perforations may include at least one set of rows of perforations. In one embodiment, the top side includes two sets of rows of perforations with one row in each set having nine perforations (120) positioned near the forward-of-center section of the housing (20), and with a second row in each set having ten perforations (130) positioned near the rearward-of-center section of the housing (20). These two sets of rows (120 and 130) are designed to facilitate air flow drafting into the housing (20) and to reduce housing (20) vacuum caused by wheel-spin. These perforations also allow for the tooling out, the dislodging and evacuation of compacting ice.

The top side also defines a plurality of apertures for affixing the housing (20) between the box-sleeve (21) and the stand-on plate (24). In one embodiment, the top side defines a forward set of two rows of apertures (140) in relation to the forward section of the housing (20) and a rearward set of two rows of apertures (150) in relation to the rearward section of the housing (20). The forward set (140) and rearward set (150) each have seven pairs of apertures each positioned and drilled to receive one of the corresponding seven U-bolts (26) for securing the stand-on plate (24), through its apertures (25), through the housing (20) and into the box-sleeve (21).

The total interior vertical side wall height distance is thirty-five (35) inches. Although the preferred standard interior horizontal housing distance is eight (8) feet and the lateral depth of the housing top side is thirty (30) inches, other smaller horizontal interior sizes are available to facilitate the range of standard tandem wheel-sets (10) on a heavy vehicle. Each side wall opening (99) is sized for receiving the girder (90), a locking cap (110), a counter-locking bolt (100), a locking pin (190), and a tightening wrench (330). In one embodiment, the side wall has a plurality of slits, such as T-slots (33), for interconnecting the protective shield (30) having T-slots (31) with a plurality of banded disc connectors (32), each connector having a short stretchable band attached between two discs for producing a quick and easy method for replacing and connecting a renewable protective exterior surface for the housing.

In another embodiment wherein the housing (20) has a segmented body, the body comprises a forward segment (220), an intermediate segment (210), and a rearward segment (200). Here, as in the previous embodiment, the top side of each forward segment (220) and rearward segment (200) has the same forward set and rearward set of two rows of apertures (140) and (150), respectively, for affixing the housing (20) between the box-sleeve (21) and the stand-on plate (24), in addition to the plurality of perforations (120) and (130) for air flow and/or ice evacuation. The side walls for each forward segment (220) and rearward segment (200) also includes a side wall opening (99) for receiving the girder (90), a locking cap (110), a counter-locking bolt (100), a locking pin (190), and a tightening wrench (330).

In another embodiment wherein the housing (20) has a segmented body, the body comprises a forward segment (220), an intermediate segment (210), and a rearward segment (200). Here, as in the previous embodiment, the top side of each forward segment (220) and rearward segment (200) has the same forward set and rearward set of two rows of apertures (140) and (150), respectively, for affixing the housing (20) between the box-sleeve (21) and the stand-on plate (24), in addition to the plurality of perforations (120) and (130) for air flow and/or ice evacuation. The side walls for each forward segment (220) and rearward segment (200) also includes a side wall opening (99) for receiving the girder (90), a locking cap (110), a counter-locking bolt (100), a locking pin (190), and a tightening wrench (120).

The forward segment (220) is about a two and one half feet in length by thirty-five inches in height by thirty inches in lateral depth. The intermediate segment (210) is about a three feet in length by thirty-five inches in height by thirty inches in lateral depth. The rearward segment (200) is about a two and one half feet in length by a thirty-five inches in height and by thirty inches in lateral depth. Each forward segment (220) and rearward segment (200) also includes a plurality of angled saw-tooth clamps (230-260) located along the face of each segment's side wall, and a plurality of saw-tooth clamps (270-290) located along the top edge of each segment. The saw-tooth clamps are angled inwardly at a 75° angle and extend outwardly from both the forward and rearward segments for inserting into a plurality of clamp ports (300) defined in the intermediate segment (210). This angle produces a locking tension when the saw-tooth clamps are clicked into respective dual locking slots (310) and (320).

The intermediate segment (210) contains a plurality of clamp ports (300) located along the side wall and top edges for receiving the forward segment (220) and the rearward segment (200) saw-tooth clamps. The intermediate segment (210) also includes seven corresponding ports (300) and seven corresponding locking slots (310) and (320). The initial locking slot (310) has a shorter height than the adjacent locking slot (320) so that the shorter locking slot (310) prevents the larger leading edges of the saw-tooth clamps (230-290) from locking prematurely into place as it slides into each respective port (300). Each side wall and top edge of the intermediate segment (210) has a gasket (305).

As described, each saw-tooth clamp (230-290) is angled at seventy-five degrees. The side-wall saw-tooth clamps (230-260) are longer in length than the three top side clamps (270-290). Each of the side-wall saw-tooth clamps (230-260) are 10 inch length×4 inch width×1 inch in depth. The top-wall innermost saw-tooth clamp (290) is 8 inch length×4 inch width×1 inch in depth; the second innermost top-wall saw-tooth clamp (280) is 7 inch length×4 inch width×1 inch in depth; the third innermost top-wall saw-tooth clamp (270) is 6 inch length×4 inch width×1 inch in depth for fitting each clamp respectively into each corresponding port, one by one.

To assemble the segmented housing (20), each side-wall saw-tooth clamp (230-260) is inserted into its corresponding port (300). Next, each top-wall saw-tooth clamp (270-290) is inserted into its corresponding port (300). The innermost top-wall saw-tooth clamp (290) is inserted first into its corresponding port, followed by the second innermost top-wall saw-tooth clamp (280) inserted into its port (300), and followed finally by the third innermost saw-tooth clamp (270) inserted into its port (300). Once all side-wall and top-wall saw-tooth clamps (230-290) have been inserted into their corresponding ports (300), each saw-tooth clamp interlocks with its corresponding pair of locking slots (310) and (320) to form an elongated, streamlined, contoured housing (20).

The housing as disclosed is not limited by construction materials to the extent such materials satisfy the structural and/or functional requirements of any claim. The housing is made from materials selected from the group consisting of plastics, polymers, natural or synthetic rubber, fiberglass or metals, and combinations and mixtures thereof. The material forming the housing is a high-density (holds shape), high strength (resists fracture) polymer that is ultraviolet stabilized (maintains composition under sunlight) for assuring maximum integrity and resistance to sun radiation, thereby allowing retention of its physical properties over a wide range of environmental variations. The material also has a high temperature tolerance (will not melt or crack in weather) for maintaining full functional operation of the apparatus under a wide temperature range, for example, between −40° F. and 140° F.

The material further demonstrates a high tinsel modulus, both in its pull-apart durability, thickness, strength, and in its resistance to fracture and to withstanding exposure. The material also includes strengtheners for reinforcing conductive fillers having anti-static properties (will not conduct a static charge), such as regular carbon black additive. Thus, to eliminate potential static charge generated from wheel-spin, a static dissipative carbon black additive is used for grounding to the vehicle frame. The housing has the ability to withstand an amplitude of modulation (vibration), including all other vibrations consistent with long term driving conditions. The material also has the ability to withstand the chemical degradation consistent with common roadway chemicals collected from normal use of the roadways. Other substantially comparable materials and compositions, including synthetic and natural rubber materials may be used for the housing.

The housing can be manufactured using techniques and technology selected from the group consisting of common molding practices, including carbon fiber/fiberglass one-sheet molding, thermoforming, thermo injection, roto-molding, blow-molding, vacuum molding, and combinations and mixtures thereof.

It should be noted that the housing may be further made of various materials, such as glass-fill nylon, or glass composite or long glass (½ inch), and any other sufficiently resilient material that incorporates a carbon black additive to eliminate static through grounding to the heavy vehicle frame. The housing is made from high lubricity polymers and materials for the ability to resist abrasion and other similar impact modifiers. The housing is also made from a paint-conducive surface material. A corresponding protective shield is made of nylon, although any range of elements that can compose a protective barrier for the housing may be used for the exterior protective shield. The banded disc connectors are made with a connecting stretchable durable and chemical resistant nylon band and polymer discs.

The fastening means is essentially a locking mechanism comprising a locking cap, a counter-threaded bolt, and a locking pin. A tightening tool may also be used to tighten or loosen the cap from the girder. The locking cap (110) is essentially a polymer cap having a flat surface defining two domed arches (143) separated by a threaded transplanar bore (105), and a plurality of vertical slots (111) extending along the perimeter of the cap. The transplanar bore (105) is sufficient to produce a compression lock holding the housing (20) interlocked with the girder (90). The transplanar bore (105) is sized to correspond with the girder (90) lateral terminus (92) and to allow the bolt (100) to easily pass through.

A counter-threaded locking bolt (100) is essentially a seven-inch long counter-threaded bolt for micro-laterally adjusting the position of the locking cap (110) in relation with the locking bolt (100) and the housing (20) side wall. The locking bolt (100) rotatably inserts completely through the locking cap (110) transplanar bore (105) and into the girder (90) counter-threaded axial bore (95). The locking bolt (100) also defines a pin-aperture (101) at its outermost terminus for receiving the locking pin (190). The locking bolt (100) is rotatably inserted through into the girder (90) axial bore (95) until the locking bolt pin-aperture (101) aligns with the top flat surface region of the locking cap (110). The locking bolt (100) pin-aperture (101) receives the locking pin (190) having a pair of perpendicular flanges that interlock with the pin-aperture (101).

A locking pin (190) essentially comprises a stainless steel (or any other sufficiently strong composite material) push-pin that inserts through the locking bolt pin-aperture (101) to create an inertia lock whenever the locking pin (190) rotates in a counterclockwise movement and abuts against the locking cap's (110) domed arches (143). Because the locking pin (190) is impaled within the locking bolt (100), the locking pin (190) travels inwardly with the locking bolt (100) in a counterclockwise direction as the locking cap (110) turns outwardly in a counterclockwise direction, and abuts the locking cap's (110) domed arches (143), thereby creating a locking mechanism.

A tool, such as a customized wrench (330), for tightening or loosening the locking cap (110) is essentially a concaved hollow cup that fits over the locking cap's exterior surface (110), a handle having a handgrip (122) and, a plurality of prongs (121) for engaging with the locking cap's vertical slots (111). The wrench (330) is hollow so that it can fully cover the domed arches (143) of the locking cap (110). The handgrip (122) provides sufficient torque to tighten or loosen the locking cap (110) without the need to use a pneumatic tool to tighten or loosen the cap (110). Whenever the wrench (330) is compressed against the surface of the locking cap (110) and turned clockwise with its handle (122), it tightens against the housing (20), moving the locking cap inwardly along the girder (90).

The locking mechanism is engaged whenever the locking pin (190) is impaled through the locking bolt pin-aperture (101) after the locking cap has been inserted over girder (90) lateral terminus (92), and a counterclockwise movement of the locking cap (110) is attempted. As a result, the counter-threaded locking bolt (100) rotates inwardly counterclockwise within the girder (90) counter-threaded axial bore (95) to a designated distance, with the locking pin (190) rotating inwardly in the same counterclockwise direction as the bolt. This movement creates resistance against the locking cap's (110) domed arches (143) as the counterclockwise movement of the locking cap is moving outwardly along the girder (90). This ensures that the housing (20) and the housing superstructure remain attached to the girder (90), and secured to the support infrastructure anchored to the vehicle framework (11). The easy removal of the locking cap (110) allows the housing superstructure to be completely and quickly removed from the wheel-sets (10) for easy maintenance of the tandem wheel assembly and braking system. After the locking pin (190) is removed from the locking bolt (100), and the tightening wrench (330) is compressed against the locking cap's surface (110), the locking cap (110) can be tightened clockwise and loosened counterclockwise from the housing (20).

After the housing (20) is adjusted and secured into place, with the girder (90) protruding slightly through the housing (20) side wall opening (99), the locking cap (110) is rotated clockwise over the girder (90) externally threaded lateral terminus (92). Next, the locking bolt (100) is inserted through the locking cap's transplanar bore (105) and tightened counterclockwise into the girder's (90) counter-threaded axial bore (95) until the locking bolt pin-aperture (101) aligns with the top surface of the locking cap (110). Each locking cap (110) is inserted through the two side wall openings (99) to rotatably attach to the respective girders (90).

The locking cap (110) can also be prevented from further tightening against the housing side wall after the locking pin (190) is inserted, by first completely rotating the locking bolt (100) into the girder (90) axial bore (95). The locking cap (110) is prevented from unscrewing counterclockwise away from the girder (90) whenever the locking mechanism experiences vibration because as the locking cap (110) turns in a counterclockwise rotation outwardly along the girder (90) lateral terminus (92), the locking pin (190) and locking bolt (100) also move counterclockwise, yet inwardly, and thereby creating a locking mechanism. Once the locking pin (190) abuts against one of the locking cap's (120) domed arches (143), the locking cap (110) is prevented from further loosening. The housing (20) is now securely locked into place.

The locking mechanism is designed to open or unlock by removing the locking pin (190) from the locking bolt pin-aperture (101) to allow a counterclockwise removal of the locking cap (110) from the girder (90) lateral terminus (92). When both locking caps (110) are removed from the girders (90), the housing superstructure may be removed entirely from the girders (90) and separated away from the wheel-set (s) (10). It should be noted that removing the housing superstructure does not require the locking bolt (100) to be removed because the locking bolt (100) may remain inserted into the girder (90) counter-threaded axial bore (95).

The method of using the invention comprises the step of providing the apparatus described above having the three-dimensionally adjustable support infrastructure, the three-dimensionally adjustable housing superstructure, and the fastening means; and the invention comprises the step of providing a replaceable protective shield (30) for renewing the housing (20) exterior side wall and a connector (32) fastening means for inserting into the shield T-slots (31) and the housing T-slots (33).

The method also includes the step of anchoring two of the support infrastructures to the framework preexisting holes with two of the anchor plates (70), each having a plurality of perpendicular J-hooks (72) and a plurality of apertures (71), and securing the anchor plates with longer frame bolts (75) into the vehicle framework (11) preexisting holes without any need to drill through or weld into any part of the vehicle framework (11). The two threaded struts (85) are inserted through two of the anchor plate (70) apertures (71), then tightened with terminal washers (83) and nuts (84) only on the exterior side of the anchor plate (70). Once secured, the opposite end of each strut (85) is slidably inserted through a vertical slot (81) defined in the vertical-lateral plate (80). Lateral and vertical adjustment along the vertical-lateral plate (80) is now available. In another embodiment, an interior anchor plate (170) and an exterior anchor plate (180) may be used instead of the anchor plate (70) having J-hooks (72).

The step of adjusting the lateral position of the support infrastructure involves slidably adjusting and positioning the vertical-lateral plate (80) inwardly and outwardly along the struts (85), followed by lightly tightening the position with terminal washers (83) and nuts (84) against both sides of the vertical-lateral plate (80). Next, the girder's (90) externally threaded proximal end (91) is threaded through the vertical-lateral plate's (80) central aperture (89) to further macro-laterally adjust the support infrastructure, and consequently the housing superstructure, so that the girder's externally threaded lateral terminus (92) aligns flush with the outside surface of the housing (20) side wall. The girder (90) is then secured with terminal washers (93) and nuts (94) against both sides of the vertical-lateral plate (80).

The next step for adjusting the vertical position occurs by slidably adjusting the vertical-lateral plate (80) upwardly or downwardly along the struts (85) and lightly tightening the position with the terminal washers (93) and nuts (94). After both the lateral positioning and the vertical positioning of the vertical-lateral plate (80) are in a desired alignment, with the girder (90) extending flush with the exterior side wall, all the terminal securing systems may be fully tightened into the vertical-lateral plate (80), thereby locking the vertical-lateral plate (80) into position both laterally and vertically.

The next step is affixing the housing (20) to two box-sleeves (21) and two stand-on plates (24). Two first attenuation rings (pre-load X-ring spacers) (23-X) slide onto both girders (90) followed by sliding the box-sleeves (21) onto the girders (90), then sliding two second attenuation rings (post-load O-ring spacers) (23-O) onto the girders (90). The housing (20) is then positioned over both box-sleeves (21) encasing the girders (90). Next, the housing (20) is positioned directly over the tandem wheel-sets (10); and the attached box-sleeve (21) is raised to a desired position for clearance by raising the vertical-lateral plate (80). Using the box-sleeve (21) exterior grooves (29) as a template, the underside of the housing (20) top side is marked to drill exact apertures (140/150) to align with the position of the box-sleeve (21) grooves (29) and the corresponding stand-on plate (24) apertures (25). The aperture pattern (25) of the stand-on plate (24) also aligns the groove pattern (29) of the box-sleeve (21). Seven pairs of corresponding perforations (140/150) are drilled through the housing (20) top side, corresponding with the box-sleeve (21) grooves (29) and the stand-on plate (24) apertures (25), and reserved for interconnection with the housing (20) using U-bolts (26) and fasteners (27 and 28). One must also drill two openings (99) in the side wall to accommodate receiving the infrastructure support girder (90) and the locking cap (110) and locking bolt (100).

The stand-on plate (24) are affixed to the top side of the housing (20) by inserting the seven U-bolts (26) through the stand-on plate (24) apertures (25) through the newly made top side apertures (140/150), then down along the box-sleeve (21) exterior grooves (29) to approximately one-inch beyond the bottom of the box-sleeve (21). A single U-bolt (26) rectangular washer (27) is inserted for each pair of U-bolt (26) end-points and secured with a set of fastening nuts (28). Thusly, a unified housing superstructure has been created securing the housing (20) between the box-sleeve (21) and the stand-on plate (24) making it ready for installation on the girder (90) and support infrastructure.

The next step is connecting the housing superstructure to the support infrastructure, namely the girders. Two X-ring spacers (23-X) slide onto both girders (90), then the girders (90) are slidably inserted through the housing superstructure's box-sleeves (21). Next, an O-ring spacer (23-O) is inserted on the girder's (90) lateral terminus (92) between the box-sleeves (21) and the interior housing side wall, followed by sliding the girder (90) through the side wall opening (99) to a flush position with the outside of the housing (20). Now the housing superstructure is supported over the support infrastructure and screens the wheel-set.

The next step involves fastening the protective shield (30) to the outside of the housing (20). The connectors (32) are inserted through the housing T-slots (33), then stretched and inserted through the protective shield T-slots (31). The housing (20) exterior side wall is now protected by a renewable protective shield (30) that can be quickly and easily replaced.

The final step involves fastening the housing superstructure into place. With the girder (90) lateral terminus (92) protruding flush with the side wall opening (99), the locking caps (110) rotatably screw clockwise onto the girders (90) lateral terminus (92) to completely tighten the housing (20) and compress against the pre-load X-ring spacer (23-X), the post-load O-ring spacer (23-O), and the box-sleeves (21). Next, the locking bolt (100) is inserted through the locking cap (110) transplanar bore (105) and rotatably screwed counterclockwise into the girder's (90) internally counter-threaded axial bore (95) until the bolt's (100) end-point pin-aperture (101) aligns with the top flat surface region of the locking cap (110). The locking bolt (100) is secured into a locked position by sliding the locking pin (190) through the locking bolt (100) pin-aperture (101). As the locking cap (110) moves counterclockwise outwardly, the domed arches (143) abut the locking pin (190) moving counterclockwise inwardly and create a level of resistance to prevent the cap (110) from further counterclockwise rotational movement. Once the locking cap (110), locking bolt (100), and locking pin (190) are installed, the locking cap (110) is co-planar with the exterior of the housing (20). In one embodiment, each step concerning assembly of the adjustable support infrastructure is performed twice so that a set of two support infrastructures are assembled and used for mounting the housing (20); assembling the adjustable housing infrastructure is also performed twice. In another embodiment, the threading of both the locking bolt (100) and the locking cap (110) may be mutually reversed, thereby producing the same locking resistance.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. An apparatus for reducing the wheel-spray and the aerodynamic drag of a wheel-set of a vehicle having a framework with holes, said apparatus comprising:
   a. a three-dimensionally adjustable support infrastructure comprising: an anchor plate for anchoring said support infrastructure to the vehicle framework, said anchor plate having a plurality of apertures for receiving two threaded struts; a vertical-lateral plate having two vertical slots for adjustably receiving said struts, and an aperture above said slots for receiving a girder; and said girder having one end rotatably engaged with said vertical-lateral plate aperture, and another end having an externally threaded lateral terminus also defining an internally counter-threaded axial bore;
   b. a three-dimensionally adjustable housing superstructure comprising: a box-sleeve having an interior chamber for slidably receiving said girder, and two exterior sides defining a plurality of vertical grooves; a housing substantially screening the wheel-set and comprising an obtuse-angled forward face and an obtuse-angled rearward face, and a top side having a plurality of apertures aligned with said grooves; and a stand-on plate having a plurality of apertures aligned with said grooves for affixing said housing between said box-sleeve and said stand-on plate with a terminal securing system; and c. means for fastening said housing superstructure to said girder.

2. The apparatus of claim 1, said anchor plate further comprising a plurality of perpendicular J-hooks for horizontally anchoring to the framework holes.

3. The apparatus of claim 1, said housing further comprising a forward side comprising said obtuse-angled forward face, and wherein said obtuse-angled forward face extends forwardly over a forward section of the wheel-set; a rearward side comprising said obtuse-angled rearward face, and wherein said obtuse-angled rearward face extends rearwardly over a rearward section of the wheel-set; and a side wall defining at least one opening for receiving said girder and said means for fastening, said side wall further comprising means for designating a center-point of said housing and for centering said housing with the wheel-set; and wherein said top side further comprises a plurality of perforations for anti-vacuum air flow and for ice evacuation.

4. The apparatus of claim 1, said apparatus further comprising a removable protective shield having a plurality of T-slots; said housing further comprising an exterior side wall having a plurality of T-slots; and a plurality of connectors, each of said connectors having a stretchable band connected between two discs for connecting between each of the said shield T-slots and each of the said exterior side wall T-slots.

5. The apparatus of claim 1, said housing superstructure further comprising a first attenuation ring receivable on said girder lateral terminus between a proximal end of said box-sleeve and said vertical-lateral plate for reducing vibration, and a second attenuation ring receivable on said girder lateral terminus between a lateral end of said box-sleeve and said means for fastening.

6. The apparatus of claim 1, said housing having a segmented body comprising:
   a. a forward segment comprising: (i) a forward side comprising said obtuse-angled forward face, and wherein said obtuse-angled forward face extends forwardly over a forward section of the wheel-set; and (ii) a plurality of saw-tooth clamps for connecting said forward segment to an intermediate segment;
   b. said intermediate segment comprising: (i) a plurality of clamp ports, (ii) a plurality of locking slots; (iii) a plurality of gaskets for connecting said forward segment and a rearward segment to said intermediate segment; and (iv) a side wall having means for designating a center-point of said housing and for centering said housing in the wheel-set;
   c. said rearward segment comprising: (i) a rearward side comprising said obtuse-angled rearward face, and wherein said obtuse-angled rearward face extends rearwardly over a rearward section of the wheel-sets; and (ii) a plurality of saw-tooth clamps for connecting said rearward segment to said intermediate segment.

7. The apparatus of claim 1, said housing formed from a material selected from the group consisting of plastics, polymers, copolymers, polyethylene, polypropylene, rubber, synthetic rubber and combinations thereof.

8. The apparatus of claim 1, said fastening means for fastening comprising:

a. a cap having an essentially planar outer face and an internally threaded transplanar bore for rotational engagement with said lateral terminus of said girder and said housing further comprising a side wall having an opening;
   b. a counter-threaded bolt having a diameter smaller than said transplanar bore and a length sufficient to rotationally engage said axial bore of said girder while inserted through said transplanar bore;
   c. means for preventing over rotation of said bolt engaged with said axial bore of said girder; and
   d. means for preventing counter rotation of said cap engaged with said bolt and said girder lateral terminus.

9. The apparatus of claim 8, said means for preventing over rotation and said means for preventing counter rotation comprising said cap planar outer face further including a pair of outstanding stops on opposite sides of said transplanar bore; and said bolt further including a head having at least one outwardly biased divergence cooperating with said stops.

10. The apparatus of claim 9, said outwardly biased divergence selected from the group consisting of a spring-biased detent ball within said bolt head and protruding outwardly from an aperture defined by said bolt head, and a separate pin inserted through a pin-aperture defined by said bolt head.

11. The apparatus of claim 9, said outwardly biased divergence comprising a separate pin inserted through a pin-aperture defined by said bolt head, said pin comprising an end-stop preventing complete push-through of said pin and at least one outwardly biased surface divergence preventing un-insertion of said pin, each of said cap outstanding stops comprising a domed arch abutting said pin.

12. The apparatus of claim 11, said outwardly biased surface divergence selected from the group consisting of a retractable flange biased outwardly from said pin and converging toward an insertion end, and a spring-biased detent ball within said pin and protruding outwardly from an aperture defined by said pin.

13. The apparatus of claim 8, said apparatus further comprising said cap planar outer face further comprising a plurality of perimeter slots, and a tightening tool having a convex exterior surface, a handle having a handgrip, and a plurality of prongs protruding from said tool to rotationally engage with said plurality of perimeter slots.

14. An apparatus for reducing the wheel-spray and aerodynamic drag of a wheel-set of a vehicle having a framework with holes, said apparatus comprising:
   a. a three-dimensionally adjustable support infrastructure comprising: an anchor plate for horizontally anchoring said support infrastructure to the vehicle framework, said anchor plate having a plurality of apertures for receiving two threaded struts and a plurality of perpendicular J-hooks; a vertical-lateral plate having two vertical slots for adjustably receiving said struts, and an aperture above said slots; and a girder having one end rotatably engaged with said vertical-lateral plate aperture, and another end having an externally threaded lateral terminus also defining an internally counter-threaded axial bore;
   b. a three-dimensionally adjustable housing superstructure comprising:
      i. a box-sleeve having an interior chamber for slidably receiving said girder, and two exterior sides defining a plurality of vertical grooves;
      ii. a housing substantially screening the wheel-set, said housing comprising a forward side having an obtuse-angled forward face extending forwardly over a forward section of the wheel-set; a rearward side having an obtuse-angled rearward face extending rearwardly over a rearward section of the wheel-set; a top side having a plurality of perforations for anti-vacuum air flow and for ice evacuation, and a plurality of apertures aligned with said grooves; and a side wall defining at least one opening for receiving said girder and means for fastening said housing superstructure to said girder, said side wall further comprising means for designating a center-point of said housing and for centering said housing in the wheel-set; and iii. a stand-on plate having a plurality of apertures aligned with said grooves for affixing said housing between said box-sleeve and said stand-on plate with a terminal securing system, said terminal securing system comprising U-bolts and fasteners; and c. said means for fastening comprising:
   i. a cap having an essentially planar outer face, an internally threaded transplanar bore for rotational engagement with said lateral terminus of said girder, and a pair of outstanding stops on opposite sides of said transplanar bore extending from the circumference of said transplanar bore toward the periphery of said cap;
   ii. a counter-threaded bolt having a diameter smaller than said transplanar bore, a length sufficient to counter-rotationally engage said axial bore of said girder while inserted through said transplanar bore, and a head having a pin-aperture; and
   iii. a pin inserted through said bolt pin-aperture, said pin having an end-stop preventing complete push-through of said pin and at least one intermediate flange allowing insertion but preventing un-insertion, said pin cooperating with said pair of outstanding stops having two domed arches to prevent counter rotation of said cap engaged with said lateral terminus of said girder and said bolt engaged with said axial bore of said girder.

15. The apparatus of claim 14, said housing superstructure further comprising a first attenuation ring receivable on said girder between a proximal end of said box-sleeve and said vertical-lateral plate for reducing vibration, and a second attenuation ring receivable on said girder between a lateral end of said box-sleeve and said housing and said means for fastening.

16. The method of using an apparatus for reducing the wheel-spray and the aerodynamic drag of a wheel-set of a vehicle having a framework having holes, said method comprising the steps of:

a. providing the apparatus comprising:
   i. a three-dimensionally adjustable support infrastructure comprising an anchor plate having a plurality of apertures for receiving two threaded struts; a vertical-lateral plate having two vertical slots for adjustably receiving said struts, and an aperture above said slots; a girder having one end rotatably engaged with said vertical-lateral plate aperture, and another end having an externally threaded lateral terminus also defining an internally counter-threaded axial bore;
   ii. a three-dimensionally adjustable housing superstructure comprising at least one box-sleeve having an interior chamber, and two exterior sides defining vertical grooves; a housing substantially screening the wheel-set, said housing comprising a top side having a plurality of perforations for air flow and ice evacuation and a plurality of apertures aligned with said grooves, and a side wall defining at least one opening for receiving said girder, said side wall further comprising a means for designating a center-point of said housing and for centering said housing in the wheel-set; and at least one stand-on plate having a plurality of apertures aligned with said grooves for affixing said housing between said box-sleeve and said stand-on plate with a U-bolt terminal securing system;
   iii. a cap having an essentially planar outer face, an internally threaded transplanar bore for rotational engagement with said lateral terminus of said girder, and a pair of outstanding stops on opposite sides of said transplanar bore from the circumference of said transplanar bore toward the periphery of said cap;
   iv. a counter-threaded bolt having a diameter smaller than said transplanar bore, a length sufficient to rotationally engage said axial bore of said girder while inserted through said transplanar bore, and a head larger than said axial bore of said girder for abutting against said axial bore of said girder, with said bolt head defining a pin-aperture, wherein said bolt remains engaged with said girder when said cap is removed; and
   v. a pin inserted through said bolt pin-aperture, said pin having an end-stop preventing complete push-through of said pin and at least one intermediate flange allowing insertion but preventing un-insertion, said pin cooperating with said pair of outstanding stops having two domed arches to prevent counter rotation of said cap engaged with said lateral terminus of said girder and said bolt engaged with said axial bore of said girder;

b. anchoring said support infrastructure horizontally to the framework holes with said anchor plate, inserting each of said threaded struts through each of said anchor plate apertures, and securing with said terminal securing system;

c. adjusting said support infrastructure laterally and vertically with said vertical-lateral plate slidably adjusted along said struts and said girder;

d. connecting said housing superstructure onto said support infrastructure by sliding said box-sleeve chamber onto said girder lateral terminus of said girder;

e. rotatably tightening said cap through said housing side wall opening onto said girder; inserting said bolt through said cap transplanar bore and rotatably tightening said bolt into said axial bore of said girder until said bolt pin-aperture is within said cap outstanding stops; and inserting said pin through said bolt pin-aperture.

17. The method of claim 16, said method further comprising the step of adjusting said support infrastructure laterally and vertically by slidably inserting said vertical-lateral plate vertical slots over said struts inwardly or outwardly, and raising or lowering along said struts and tightening into place; and by rotatably inserting said girder through said vertical-lateral plate aperture and adjusting said girder inwardly or outwardly within said vertical-lateral plate aperture.

18. The method of claim 16, said method further comprising the step of rotatably tightening said cap with a tightening tool having a concave interior surface cooperating with said cap planar outer face, a handle having a handgrip, and a plurality of prongs for engaging with said cap planar outer face perimeter further comprising a plurality of slots.

19. The method of claim 16, said method further comprising the step of preventing substantial rotation that loosens said cap outwardly from said lateral terminus of said girder by rotatably adjusting said bolt in the opposite direction inwardly onto said axial bore of said girder to a desired degree, and inserting said pin having an end-point to abut said cap outstanding stops comprising said two domed arches.

\* \* \* \* \*